(12) United States Patent
Tseng et al.

(10) Patent No.: US 12,245,235 B2
(45) Date of Patent: Mar. 4, 2025

(54) METHOD AND USER EQUIPMENT FOR SIDELINK PACKET EXCHANGE OPERATION

(71) Applicant: SHARP KABUSHIKI KAISHA, Sakai (JP)

(72) Inventors: Yung-Lan Tseng, Taipei (TW); Chia-Hao Yu, Taipei (TW); Hsin-Hsi Tsai, Taipei (TW); Yu-Hsin Cheng, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 308 days.

(21) Appl. No.: 17/794,412

(22) PCT Filed: Jan. 21, 2021

(86) PCT No.: PCT/CN2021/073121
§ 371 (c)(1),
(2) Date: Jul. 21, 2022

(87) PCT Pub. No.: WO2021/147959
PCT Pub. Date: Jul. 29, 2021

(65) Prior Publication Data
US 2023/0066448 A1 Mar. 2, 2023

Related U.S. Application Data

(60) Provisional application No. 62/964,012, filed on Jan. 21, 2020.

(51) Int. Cl.
*H04W 72/20* (2023.01)
*H04W 24/08* (2009.01)
(Continued)

(52) U.S. Cl.
CPC ........... *H04W 72/20* (2023.01); *H04W 24/08* (2013.01); *H04W 74/0808* (2013.01); *H04W 76/23* (2018.02); *H04W 76/28* (2018.02)

(58) Field of Classification Search
CPC . H04W 72/20; H04W 24/08; H04W 74/0808; H04W 76/23; H04W 76/28; H04W 52/365
See application file for complete search history.

(56) References Cited

U.S. PATENT DOCUMENTS

2009/0046627 A1 2/2009 Xu
2019/0037495 A1 1/2019 John Wilson et al.
(Continued)

FOREIGN PATENT DOCUMENTS

CN 101690369 A 3/2010
CN 108307486 A 7/2018
(Continued)

OTHER PUBLICATIONS

Coolpad: "Discussion on power saving for PC5-based V2P", 3GPP Draft; R2-168273, 3GPP TSG-RAN WG2 Meeting #96, Reno, USA, Nov. 14-18, 2016 (Nov. 13, 2016).
(Continued)

*Primary Examiner* — Christine Ng
(74) *Attorney, Agent, or Firm* — ScienBiziP, P.C.

(57) ABSTRACT

A method performed by a UE is provided. The method includes receiving at least one SL-DRX configuration and a plurality of SL resource pool configurations to be configured on the first UE; performing partial sensing based on at least one of the plurality of SL resource pool configurations when an SL-DRX operation is performed based on the at least one SL-DRX configuration, each of at least one SL resource pool configured by the at least one of the plurality of SL resource pool configurations comprising one or more time slots; and
(Continued)

performing SL-CBR measurement associated with each of the at least one SL resource pool in the one or more time slots where the partial sensing is performed.

20 Claims, 7 Drawing Sheets

(51) Int. Cl.
*H04W 74/0808* (2024.01)
*H04W 76/23* (2018.01)
*H04W 76/28* (2018.01)

(56) References Cited

U.S. PATENT DOCUMENTS

| | | |
|---|---|---|
| 2019/0261216 A1 | 8/2019 | Lee et al. |
| 2019/0306923 A1 | 10/2019 | Xiong et al. |
| 2019/0387377 A1 | 12/2019 | Zhang et al. |
| 2020/0008266 A1 | 1/2020 | Pan et al. |
| 2020/0029245 A1* | 1/2020 | Khoryaev .............. H04W 36/22 |
| 2020/0196279 A1* | 6/2020 | Thomas ................ H04W 72/04 |
| 2020/0260413 A1 | 8/2020 | Hong et al. |
| 2020/0296668 A1 | 9/2020 | Xu et al. |
| 2021/0037468 A1* | 2/2021 | Huang .................. H04W 76/14 |
| 2021/0136646 A1* | 5/2021 | Tseng ................ H04W 36/0072 |
| 2021/0195637 A1* | 6/2021 | Xue .................. H04W 74/0808 |
| 2021/0297842 A1 | 9/2021 | Shrivastava et al. |
| 2021/0400650 A1* | 12/2021 | Shilov ................... H04L 5/0094 |
| 2022/0039082 A1* | 2/2022 | Belleschi .............. H04W 72/51 |
| 2023/0014303 A1* | 1/2023 | Di Girolamo ........ H04W 72/20 |
| 2023/0066448 A1* | 3/2023 | Tseng ................ H04W 74/0808 |

FOREIGN PATENT DOCUMENTS

| | | |
|---|---|---|
| CN | 109041146 A | 12/2018 |
| CN | 109479189 A | 3/2019 |
| CN | 116941276 A | 10/2023 |
| JP | 2019525607 A | 9/2019 |
| JP | 2019532580 A | 11/2019 |
| WO | 2019096705 A1 | 5/2019 |
| WO | 2020008539 A1 | 1/2020 |

OTHER PUBLICATIONS

Intel Corporation, "CR on V2X RRM Core requirements corrections", R4-1704157, 3GPP TSG-RAN4 Meeting #82bis, Spokane, USA, Apr. 3-7, 2017 (Jun. 2, 2017).

Intel Corporation, "CR on V2X RRM Core requirements corrections", R4-1703970, 3GPP TSG-RAN4 Meeting #82bis, Spokane, USA, Apr. 3-7, 2017 (Mar. 25, 2017).

3GPP TS 38.321, "3rd Generation Partnership Project; Technical Specification Group Radio Access Network; NR; Medium Access Control (MAC) protocol specification (Release 15)", V15.8.0 (Dec. 2019).

3GPP TS 38.213, "3rd Generation Partnership Project; Technical Specification Group Radio Access Network; NR; Physical layer procedures for control (Release 16)", V16.0.0 (Dec. 2019).

3GPP TS 38.214, "3rd Generation Partnership Project; Technical Specification Group Radio Access Network; NR; Physical layer procedures for data (Release 16)", V16.0.0 (Dec. 2019).

3GPP TS 38.331, "3rd Generation Partnership Project; Technical Specification Group Radio Access Network; NR; Radio Resource Control (RRC) protocol specification (Release 15)", V15.8.0 (Dec. 2019).

* cited by examiner

METHOD AND USER EQUIPMENT FOR SIDELINK PACKET EXCHANGE OPERATION

CROSS-REFERENCE TO RELATED APPLICATION(S)

The present disclosure is a national stage application, filed under 35 U.S.C. § 371, of International Patent Application No. PCT/CN2021/073121, filed on Jan. 21, 2021, which claims the benefit of and priority to U.S. Provisional Patent Application Ser. No. 62/964,012, filed on Jan. 21, 2020, entitled "Sidelink Discontinuous Reception (SL-DRX) Mechanisms," the contents of all of which are hereby fully incorporated herein by reference for all purposes.

FIELD

The present disclosure generally relates to wireless communications, and more particularly, to a method and a user equipment for sidelink (SL) packet exchange operation.

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need in the art to improve sidelink (SL) packet exchange operations.

SUMMARY

The present disclosure is directed to methods and user equipment (UE) for sidelink (SL) packet exchange operation.

According to a first aspect of the present disclosure, a method performed by a first User Equipment (UE) for a Sidelink (SL) packet exchange operation is provided. The method includes receiving at least one SL-Discontinuous Reception (SL-DRX) configuration and a plurality of SL resource pool configurations to be configured on the first UE; performing partial sensing based on at least one of the plurality of SL resource pool configurations when an SL-DRX operation is performed based on the at least one SL-DRX configuration, each of at least one SL resource pool configured by the at least one of the plurality of SL resource pool configurations comprising one or more time slots; and performing SL-Channel Busy Ratio (SL-CBR) measurement associated with each of the at least one SL resource pool in the one or more time slots where the partial sensing is performed.

In an implementation of the first aspect, the method further comprises receiving an indicator, which is associated with a first SL resource pool configuration among the plurality of resource pool configurations, of whether the first UE is enabled to perform partial sensing on a first SL resource pool configured by the first SL resource pool configuration during at least one SL-DRX off-period.

According to a second aspect of the present disclosure, a User Equipment (UE) in a wireless communication system for Sidelink (SL) packet exchange is provided and the wireless communication system comprises a Base Station (BS). The UE includes one or more non-transitory computer-readable media having computer-executable instructions embodied therein; and at least one processor coupled to the one or more non-transitory computer-readable media, the at least one processor configured to execute the computer-executable instructions to cause the UE to receive at least one SL-Discontinuous Reception (SL-DRX) configuration and a plurality of SL resource pool configurations configured on the first UE; perform partial sensing based on at least one of the plurality of SL resource pool configurations when an SL-DRX operation is performed based on the at least one SL-DRX configuration, each of at least one SL resource pool configured by the at least one of the plurality of SL resource pool configurations comprising one or more time slots; and perform SL-Channel Busy Ratio (SL-CBR) measurement associated with each of the at least one SL resource pool in the one or more time slots where the partial sensing is performed.

In an implementation of the second aspect, the at least one processor is further configured to execute the computer-executable instructions to cause the UE to receive an indicator, which is associated with a first SL resource pool configuration among the plurality of resource pool configurations, of whether the first UE is enabled to perform partial sensing on a first SL resource pool configured by the first SL resource pool configuration during at least one SL-DRX off-period.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

DESCRIPTION

Figure 1:
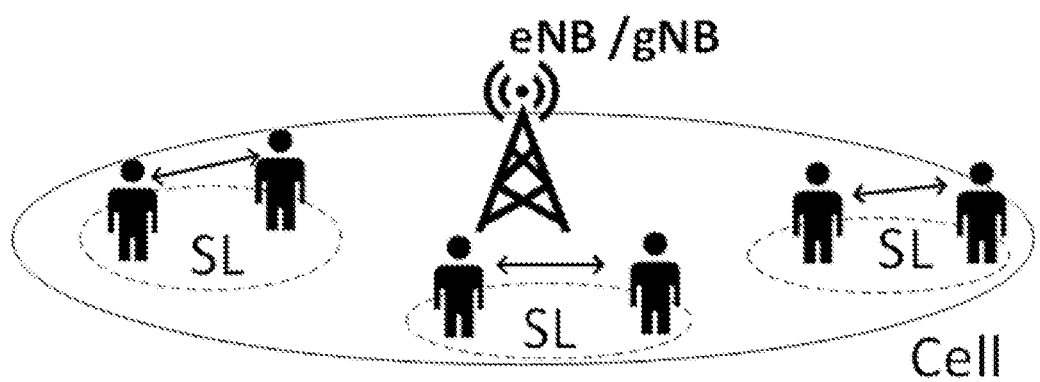
FIG. 1 illustrates an SL operation for UEs to exchange information according to an example implementation of the present disclosure.

The following contains specific information pertaining to exemplary implementations in the present disclosure. The drawings and their accompanying detailed disclosure are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

The following contains specific information pertaining to example implementations in the present disclosure. The drawings and their accompanying detailed disclosure are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices. For example, one or more microprocessors or general-purpose computers with communication processing capability may be programmed with corresponding executable instructions and carry out the disclosed NW function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long Term Evolution (LTE) system, an LTE-Advanced (LTE-A) system, or an LTE-Advanced Pro system) typically includes at least one Base Station (BS), at least one user equipment (UE), and one or more optional NW elements that provide connection towards an NW. The UE communicates with the NW (e.g., a Core NW (CN), an Evolved Packet Core (EPC) NW, an Evolved Universal Terrestrial Radio Access NW (E-UTRAN), a Next-Generation Core (NGC), a 5G Core Network (5GC), or an Internet), through a Radio Access NW (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE Radio Access NW (GERAN), a Next Generation eNB (ng-eNB) as in an E-UTRA BS in connection with the 5GC, a next-generation Node B (gNB) as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols above.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the Downlink (DL) and optionally UL resources to at least one UE within its radio coverage for DL and optionally Uplink (UL) packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A PSCell may refer to the SpCell of an SCG. MCG refers to a group of serving cells associated with the Master Node (MN), comprising the SpCell and optionally one or more secondary cells (SCells). SCG refers to a group of serving cells associated with the Secondary Node (SN), comprising of the SpCell and optionally one or more SCells. Please also note, in some implementations, the UE may not have (LTE/NR) Radio Resource Control (RRC) connections with the concerned serving cells of the associated services (In other words, the UE may not have UE-specific RRC signalings exchange with the serving cell. Instead, the UE may only monitor the DL synchronization signals (e.g., DL synchronization burst sets) and/or broadcasting System Information (SI) related to the concerned services from such serving cells). In addition, the UE may have at least one serving cell on one or more target SL frequency carriers for the associated services. In some additional implementations, the UE may consider the RAN which configures one or more of the serving cells as a serving RAN.

As discussed above, the frame structure for NR is to support flexible configurations for accommodating various next generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the NW dynamics of NR. In addition, SL resources may also be provided in an NR frame to support ProSe services.

General Description of DRX Operation

In some implementations, the UE may be configured with a DRX functionality that controls the UE's Physical Downlink Control Channel (PDCCH) monitoring activity. When in RRC_CONNECTED, the UE may not have to continuously monitor one or more PDCCHs when DRX is configured. In some implementations, the DRX may be characterized by the following:

on-duration: this may be the duration that the UE waits for, after waking up, to receive PDCCHs. If the UE successfully decodes a PDCCH, the UE may stay awake and (re)starts the inactivity-timer;

inactivity-timer: this may be the duration that the UE waits to successfully decode a PDCCH, from the last successful decoding of a PDCCH, failing of which can send the UE back to sleep. The UE may restart the inactivity timer following a single successful decoding of a PDCCH for a first transmission only (i.e., not for retransmissions);

retransmission-timer: this may be the duration until a (e.g., Hybrid Automatic Repeat Request, HARQ) retransmission is expected;

cycle: this may specify the periodic repetition of the on-duration followed by a possible period of inactivity;

Active-Time: this may be the total duration that the UE monitors PDCCHs. This may include the "on-duration" of the DRX cycle, the time during which the UE is performing continuous reception while the inactivity-timer has not expired, and the time during which the UE is performing continuous reception while waiting for a retransmission opportunity.

In some implementations, more detailed UE's behaviors may be introduced in the following. The Medium Access Control (MAC) entity may be configured by the RRC layer/entity with a DRX functionality that controls the UE's PDCCH monitoring activity for the MAC entity's Cell-Radio Network Temporary Identifier (C-RNTI), Configured Scheduling-Radio Network Temporary Identifier (CS-RNTI), Interruption-Radio Network Temporary Identifier (INT-RNTI), Slot Format Indication-Radio Network Temporary Identifier (SFI-RNTI), Semi-Persistent-Channel State Information-Radio Network Temporary Identifier (SP-CSI-RNTI), Transmit Power Control-Physical Uplink Control Channel-Radio Network Temporary Identifier (TPC-PUCCH-RNTI), Transmit Power Control-Physical Uplink Shared Channel-Radio Network Temporary Identifier (TPC-PUSCH-RNTI), Modulation Coding Scheme Cell-RNTI (MCS-C-RNTI), Random Access-RNTI (RA-RNTI), Paging-RNTI (P-RNTI), System Information-RNTI (SI-RNTI), Sidelink-RNTI (sl-RNTI), Sidelink Configured Scheduling-RNTI (sl-CS-RNTI), and Transmit Power Control-Sounding Reference Symbols-Radio Network Temporary Identifier (TPC-SRS-RNTI). When using DRX operation, the MAC entity may also monitor one or more PDCCHs according to requirements found in the 3GPP Technical Specification (TS). When in RRC_CONNECTED, if DRX is configured, for all the activated serving cells, the MAC entity may monitor the PDCCHs discontinuously using the DRX operation; otherwise, the MAC entity may monitor the PDCCH.

In some implementations, the RRC may control the DRX operation by configuring the following parameters:

drx-onDurationTimer: this may be the duration at the beginning of a DRX cycle;

drx-SlotOffset: this may be the delay before starting the drx-onDurationTimer;

drx-InactivityTimer: this may be the duration after the PDCCH occasion in which a PDCCH indicates a new UL or DL transmission for the MAC entity;

drx-RetransmissionTimerDL (per DL HARQ process except for the broadcast process): this may be the maximum duration until a DL retransmission is received;

drx-Retransmission TimerUL (per UL HARQ process): this may be the maximum duration until a grant for UL retransmission is received;

drx-LongCycleStartOffset: this may be the Long DRX cycle and drx-StartOffset which defines the subframe where the Long or Short DRX cycle starts;

drx-ShortCycle (optional): this may be the Short DRX cycle;

drx-ShortCycleTimer (optional): this may be the duration that the UE may follow in the Short DRX cycle;

drx-HARQ-RTT-TimerDL (per DL HARQ process except for the broadcast process): this may be the minimum duration before a DL assignment for HARQ retransmission is expected by the MAC entity;

drx-HARQ-RTT-TimerUL (per UL HARQ process): this may be the minimum duration before a UL HARQ retransmission grant is expected by the MAC entity.

In some implementations, when a DRX cycle is configured, the (SL-DRX) Active Time may include the time while:

drx-onDurationTimer or drx-InactivityTimer or drx-RetransmissionTimerDL or drx-RetransmissionTimerUL or ra-ContentionResolutionTimer (as described in the 3GPP TS 38 series specifications) is running; or a Scheduling Request (SR) is sent on a PUCCH and is pending (as described in the 3GPP TS 38 series specifications); or a PDCCH indicating a new transmission addressed to the C-RNTI of the MAC entity has not been received after successful reception of a Random Access Response for the Random Access Preamble not selected by the MAC entity among the contention-based Random Access Preamble (as described in the 3GPP TS 38 series specifications).

In some implementations, when DRX is configured, the MAC entity may:

1> if a MAC PDU is received in a configured downlink assignment:
    2> start the drx-HARQ-RTT-TimerDL for the corresponding HARQ process in the first symbol after the end of the corresponding transmission carrying the DL HARQ feedback;
    2> stop the drx-Retransmission TimerDL for the corresponding HARQ process.

1> if a MAC PDU is transmitted in a configured uplink grant:
    2> start the drx-HARQ-RTT-TimerUL for the corresponding HARQ process in the first symbol after the end of the first repetition of the corresponding PUSCH transmission;
    2> stop the drx-RetransmissionTimerUL for the corresponding HARQ process.

1> if a drx-HARQ-RTT-TimerDL expires:
    2> if the data of the corresponding HARQ process was not successfully decoded:
        3> start the drx-RetransmissionTimerDL for the corresponding HARQ process in the first symbol after the expiry of drx-HARQ-RTT-TimerDL.

1> if a drx-HARQ-RTT-TimerUL expires:
    2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:
    2> stop drx-onDurationTimer;
    2> stop drx-InactivityTimer.

1> if drx-InactivityTimer expires or a DRX Command MAC CE is received:
    2> if the Short DRX cycle is configured:
        3> start or restart drx-ShortCycleTimer in the first symbol after the expiry of drx-InactivityTimer or in the first symbol after the end of DRX Command MAC CE reception;
        3> use the Short DRX cycle.
    2> else:
        3> use the Long DRX cycle.

1> if drx-ShortCycleTimer expires:
    2> use the Long DRX cycle.

1> if a Long DRX Command MAC CE is received:
    2> stop drx-ShortCycleTimer;
    2> use the Long DRX cycle.

1> if the Short DRX cycle is used, and $[(SFN \times 10)+$ subframe number] modulo (drx-ShortCycle)=(drx-StartOffset) modulo (drx-ShortCycle); or 1> if the Long DRX cycle is used, and $[(SFN \times 10)+$ subframe number] modulo (drx-LongCycle)=drx-StartOffset:
    2> start drx-onDurationTimer after drx-SlotOffset from the beginning of the subframe.

1> if the MAC entity is in Active Time:
    2> monitor the PDCCH as specified in the TS;
    2> if the PDCCH indicates a DL transmission:
        3> start the drx-HARQ-RTT-TimerDL for the corresponding HARQ process in the first symbol after the end of the corresponding transmission carrying the DL HARQ feedback;
        3> stop the drx-RetransmissionTimerDL for the corresponding HARQ process.
    2> if the PDCCH indicates a UL transmission:
        3> start the drx-HARQ-RTT-TimerUL for the corresponding HARQ process in the first symbol after the end of the first repetition of the corresponding PUSCH transmission;
        3> stop the drx-RetransmissionTimerUL for the corresponding HARQ process.
    2> if the PDCCH indicates a new transmission (DL or UL):
        3> start or restart drx-InactivityTimer in the first symbol after the end of the PDCCH reception.

1> in current symbol n, if the MAC entity may not be in Active Time considering grants/assignments/DRX Command MAC CE/Long DRX Command MAC CE received and SR sent until 4 ms prior to symbol n when evaluating all DRX Active Time conditions as specified in this clause:
    2> not transmit periodic SRS and semi-persistent SRS defined in the TS;
    2> not report CSI on PUCCH and semi-persistent CSI on PUSCH.

1> if CSI masking (csi-Mask) is setup by upper layers:
    2> in current symbol n, if drx-onDurationTimer may not be running considering grants/assignments/DRX Command MAC CE/Long DRX Command MAC CE received until 4 ms prior to symbol n when evaluating all DRX Active Time conditions as specified in this clause:
3> not report CSI on PUCCH.

In some implementations, regardless of whether the MAC entity is monitoring PDCCHs or not, the MAC entity may transmit HARQ feedback, aperiodic CSI on PUSCH, and aperiodic SRS as described in the 3GPP TS 38 series specifications when such is expected. The MAC entity may need not to monitor the PDCCH if it is not a complete PDCCH occasion (e.g. the (SL-DRX) Active Time starts or ends in the middle of a PDCCH occasion).

DRX Command MAC CE

In some implementations, a DRX Command MAC CE may be identified by a MAC subheader with a Logical Channel Identification (LCID) as specified in the 3GPP TS 38 series specifications. Specifically, it may have a fixed size of zero bits.

Long DRX Command MAC CE

In some implementations, a Long DRX Command MAC CE may be identified by a MAC subheader with a LCID as described in the 3GPP TS 38 series specifications. Specifically, it may have a fixed size of zero bits.

Configuration of DRX

In some implementations, an IE DRX-Config may be used to configure DRX related parameters, which may be described in the following:

ASN1START
TAG-DRX-CONFIG-START
DRX-Config:: =SEQUENCE {
  drx-onDurationTimer CHOICE {
    subMilliSeconds INTEGER (1 . . . 31),
    milliSeconds ENUMERATED {
      ms1, ms2, ms3, ms4, ms5, ms6, ms8, ms10, ms20, ms30, ms40, ms50, ms60,
      ms80, ms100, ms200, ms300, ms400, ms500, ms600, ms800, ms1000, ms1200,
      ms1600, spare8, spare7, spare6, spare5, spare4, spare3, spare2, spare 1}
  },
  drx-InactivityTimer ENUMERATED {
    ms0, ms1, ms2, ms3, ms4, ms5, ms6, ms8, ms10, ms20, ms30, ms40, ms50, ms60, ms80,
    ms100, ms200, ms300, ms500, ms750, ms1280, ms1920, ms2560, spare9, spare8,
    spare7, spare6, spare5, spare4, spare3, spare2, spare1},
  drx-HARQ-RTT-TimerDL INTEGER (0 . . . 56),
  drx-HARQ-RTT-TimerUL INTEGER (0 . . . 56),
  drx-Retransmission TimerDL ENUMERATED {
    sl0, sl1, sl2, sl4, sl6, sl8, sl16, sl24, sl33, sl40, sl64, sl80, sl96, sl112, sl128,
    sl160, sl320, spare15, spare14, spare13, spare12, spare11, spare10, spare9,
    spare8, spare7, spare6, spare5, spare4, spare3, spare2, spare1},
  drx-RetransmissionTimerUL ENUMERATED {
    sl0, sl1, sl2, sl4, sl6, sl8, sl16, sl24, sl33, sl40, sl64, sl80, sl96, sl112, sl128,
    sl160, sl320, spare15, spare14, spare13, spare12, spare11, spare10, spare9,
    spare8, spare7, spare6, spare5, spare4, spare3, spare2, spare1},
  drx-LongCycleStartOffset CHOICE {
    ms10 INTEGER (0 . . . 9),
    ms20 INTEGER (0 . . . 19),
    ms32 INTEGER (0 . . . 31),
    ms40 INTEGER (0 . . . 39),
    ms60 INTEGER (0 . . . 59),
    ms64 INTEGER (0 . . . 63),
    ms70 INTEGER (0 . . . 69),
    ms80 INTEGER (0 . . . 79),
    ms128 INTEGER (0 . . . 127),
    ms160 INTEGER (0 . . . 159),
    ms256 INTEGER (0 . . . 255),
    ms320 INTEGER (0 . . . 319),
    ms512 INTEGER (0 . . . 511),
    ms640 INTEGER (0 . . . 639),
    ms1024 INTEGER (0 . . . 1023),
    ms1280 INTEGER (0 . . . 1279),
    ms2048 INTEGER (0 . . . 2047),
    ms2560 INTEGER (0 . . . 2559),
    ms5120 INTEGER (0 . . . 5119),
    ms10240 INTEGER (0 . . . 10239)
  },
  shortDRX SEQUENCE {
    drx-ShortCycle ENUMERATED {
      ms2, ms3, ms4, ms5, ms6, ms7, ms8, ms10, ms14, ms16, ms20, ms30, ms32,
      ms35, ms40, ms64, ms80, ms128, ms160, ms256, ms320, ms512, ms640, spare9,
      spare8, spare7, spare6, spare5, spare4, spare3, spare2, spare1},
    drx-ShortCycleTimer INTEGER (1 . . . 16)
  } OPTIONAL, —Need R
  drx-SlotOffset INTEGER (0 . . . 31)
}
TAG-DRX-CONFIG-STOP
ASN1STOP Also, the DRX-Config field description may be described as follows:
drx-HARQ-RTT-TimerDL: this may be the value in a number of symbols of the BWP where the transport block was received.
drx-HARQ-RTT-TimerUL: this may be the value in a number of symbols of the BWP where the transport block was transmitted.
drx-InactivityTimer: this may be the value in multiple integers of 1 ms. For example, ms0 corresponds to 0, ms1 corresponds to 1 ms, ms2 corresponds to 2 ms, and so on.
drx-LongCycleStartOffset: this may include a drx-LongCycle in ms and a drx-StartOffset in multiples of 1 ms. If the drx-ShortCycle is configured, the value of the drx-LongCycle may be a multiple of the drx-ShortCycle value.
drx-onDurationTimer: this may be the value in multiples of $\frac{1}{32}$ ms (sub-milli-seconds) or in ms (milli-second). For the latter, value ms1 corresponds to 1 ms, value ms2 corresponds to 2 ms, and so on.
drx-Retransmission TimerDL: this may be the value in a number of slot lengths of the BWP where the transport block was received. For example, value sl0 corresponds to 0 slots, sl1 corresponds to 1 slot, sl2 corresponds to 2 slots, and so on.
drx-Retransmission TimerUL: this may be the value in a number of slot lengths of the BWP where the transport block was transmitted. For example, sl0 corresponds to 0 slots, sl1 corresponds to 1 slot, sl2 corresponds to 2 slots, and so on.
drx-ShortCycleTimer: this may be the value in multiples of the drx-ShortCycle. For example, a value of 1 corresponds to the drx-ShortCycle, a value of 2 corresponds to 2*the drx-ShortCycle and so on.

drx-ShortCycle: this may be the value in ms. For example, ms1 corresponds to 1 ms, ms2 corresponds to 2 ms, and so on.

drx-SlotOffset: this may be the value in multiples of $\frac{1}{32}$ ms. For example, value 0 corresponds to 0 ms, value 1 corresponds to $\frac{1}{32}$ ms, value 2 corresponds to $\frac{2}{32}$ ms, and so on.

V2X Services and PC5 Interface

In some implementations, Vehicle-to-Everything (V2X) service may be provided to support the information exchange between vehicles. V2X service includes at least one of a Vehicle-to-Infrastructure (V2I) service, a Vehicle-to-Pedestrian (V2P) service, a Vehicle-to-Network (V2N) service and a Vehicle-to-Vehicle (V2V) service. In LTE protocols, the V2X service can be supported in the air interface by a Uu interface and a PC5 interface. The PC5 interface covers the designs in Layer 2 and Layer 1. The airlink interface on a PC5 interface is also called an SL in LTE protocols. LTE networks support SL operations since the 3GPP TS Rel. 12. Referring to FIG. 1, FIG. 1 illustrates an SL operation for UEs to exchange information according to an example implementation of the present disclosure. As shown in FIG. 1, UEs may exchange data and control signaling directly without the relaying of the BS (e.g., eNB in LTE network or gNB in NR network). For the convenience of description, each of the UEs in this disclosure is capable and authorized to access a V2X service through PC5 interface with neighbor UEs and RAN.

In some implementations, the V2X service may be further categorized based on different cast-types, such as:

Unicast: Only two UEs in an SL group and the formulation of the SL group may be formulated in the Non-Access-Stratum (NAS layer).

Multi-cast (Groupcast): More than two UEs may be grouped in an SL group to exchange SL packets with all members in the SL group. In one implementation, the SL group may be formulated in the NAS layer (e.g., V2X application layer or PC5-S protocols) or AS layer (e.g., SL RRC Layer signaling, PC5-RRC signaling).

Broadcast: No limitation to the SL group. A UE may be able to broadcast message(s) and its neighboring UE(s) under the SL communication range and may receive and decode the broadcasting message(s) successfully. In some implementations, the SL communication range may differ with Tx power, hardware sensitivity, etc.

In some implementations, to enable SL operation (e.g., SL operation configured to support LTE (V2X) sidelink communication, LTE sidelink discovery, LTE Device-to-Device (D2D) service, LTE FeD2D service, NR (V2X) SL communication and NR SL discovery) under the coverage of RANs (e.g., E-UTRAN or NR-RAN), (LTE/NR), cells may provide SL configurations and SL resource allocations to the UEs. To the UEs under the coverage of cellular networks, the UEs may need to perform SL operations based on the configuration of the RANs. To enable SL operation under the coverage of a RAN, the serving cell (or camped cells) may need to provide SL configurations and SL resource allocations to the UEs. Specifically, two basic approaches are provided for SL resource allocation in LTE V2X service in the following.

In one implementation, scheduled resource allocation may be characterized by:

The UE may need to be in the (LTE/NR) RRC_Connected state in order to transmit data;

The UE may request SL resources from the eNB (by sending SL buffer status report (SL-BSR) to the serving cell). The eNB schedules dedicated SL resource for the UE to transmit SCI and SL data. To achieve this, the eNB may request the UE to report an SL-BSR through a Uu interface. In addition, the UE may also trigger an SR on a UL physical resource (e.g., PUCCH) or initiate a random access procedure while the UE wants to transmit an SL-BSR to the eNB but a valid UL resource is absent. Also, the SR resource (or configurations) and the SR procedure may be common for both SL operations and uplink traffic.

In another implementation, a UE autonomous resource selection from SL resource pools may be characterized by:

The UE autonomous resource selection may be applied to both the RRC Connected state (e.g., through dedicated RRC signaling or through SI broadcasting) and the RRC Inactive or Idle state (e.g. through SI broadcasting).

The resource pool may be a set of (virtually continuous) resource blocks and UE may decide which physical resource blocks that the UE wants to apply for SL packet transmission autonomously.

The UE on its own may select resources from resource pools and perform transport format selection to transmit SL control information and data;

The UE may perform sensing for (re) selection of SL resources before SL packet delivery. Based on the sensing results, the UE (re) selects some specific SL resources and reserves multiple SL resources. Up to 2 parallel (independent) resource reservation processes may be allowed to be performed by the UE. The UE may be also allowed to perform a single resource selection for its V2X SL transmission.

It is also noted that, when the UE is out of the RAN coverage on the frequency used for V2X SL communication and if the BS found by the UE on the concerned SL frequency carrier does not provide a V2X SL configuration for that frequency, the UE may use a set of transmission and reception resource pools pre-configured in the UE. The V2X SL communication resources may not be shared with other non-V2X data transmitted over the SL. In some implementations, the UE may obtain the pre-configuration through the installed Universal Mobile Telecommunication System (UMTS) Subscriber Identity Module (USIM), stored memory, or through the RAN which the UE has been accessed earlier. Moreover, the UE may implement a PC5 interface by synchronizing with the Global Navigation Satellite System (GNSS) and applying pre-configuration. Under such circumstances, the PC5 interface may be independent of the RAN and (LTE/NR) Uu interface.

V2X Platoon Scenario

Figure 2:
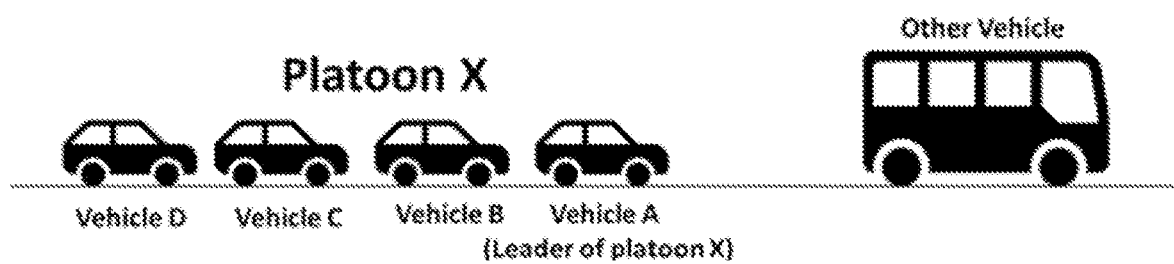
FIG. 2 illustrates a V2X platoon scenario according to an example implementation of the present disclosure.

Referring to FIG. 2, FIG. 2 illustrates a V2X platoon scenario according to an example implementation of the present disclosure. As shown in FIG. 2, the Platoon X may include Vehicle A, Vehicle B, Vehicle C, and Vehicle D, and there may be (at least) one scheduler (e.g., Vehicle A) in the platoon. In Platoon X, Vehicle A may configure SL resources to members in the same platoon through the following approaches.

Mode 1-like approach: the scheduler may configure dynamic SL grants to members in the same platoon (e.g., dynamic SL grant through SCI). In addition, the scheduler may also configure a semi-periodic SL grant (e.g., a configured SL grant) to the UEs through SL control signalings (e.g., through Physical Sidelink Broadcast Channel (PSBCH), or SL RRC signaling). To achieve Mode 1-like approach, the scheduler may need the UEs to provide feedback information through one or more PC5 interfaces.

Mode 2-like approach: the scheduler may configure SL resource pools to members in the same platoon. The UEs may select SL grants by the UEs themselves automatically (e.g., SL grant selection w/wo sensing). The platoon scenario may be applied when the vehicles of the platoon is in-coverage (i.e., all of the vehicles in the platoon is under the coverage of a cellular RAN), out-of-coverage (i.e., all of the vehicles in the platoon is out of the coverage of a cellular RAN), or partial in-coverage (i.e., some of the UEs in the platoon is in-coverage of a cellular RAN and the other UEs in the platoon is out-of-coverage of the cellular RAN).

In some implementations, to support the scheduler, the members in the Platoon may need to support the following to report their own statuses to the scheduler through a PC5 interface:
  (a) SL-SR configuration and report thereof;
  (b) SL-buffer status report (SL-BSR) configuration and report thereof;
  (c) SL-power headroom report (SL-PHR) configuration and report thereof.

Figure 3:
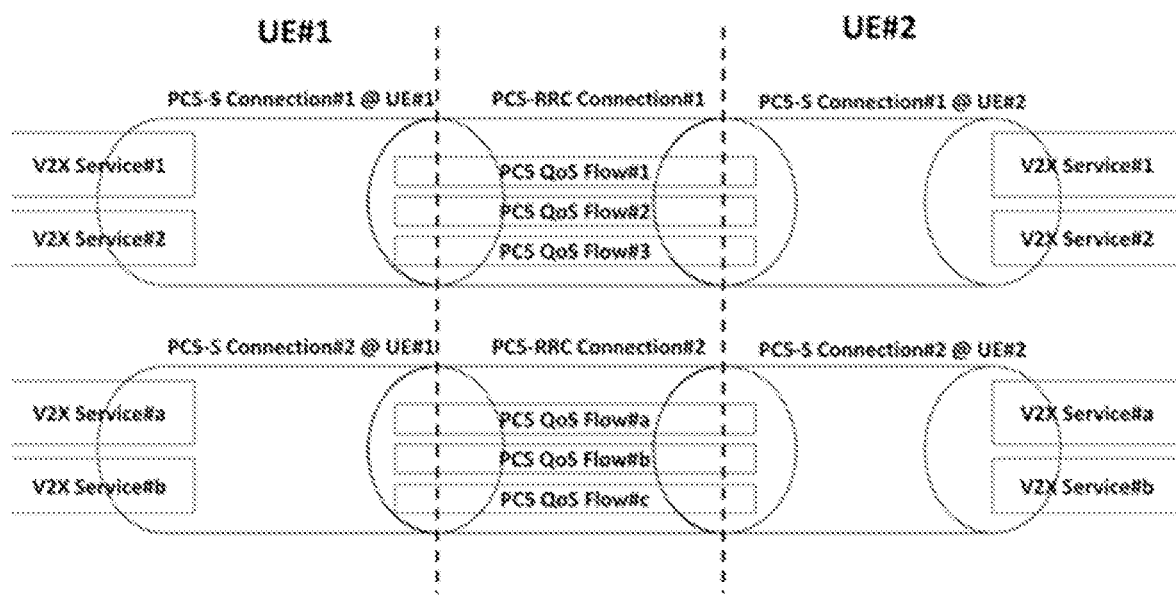
FIG. 3 illustrates a PC5-RRC connections between a pair of UEs according to an example implementation of the present disclosure.

Referring to FIG. 3, FIG. 3 illustrates PC5-RRC connections between a pair of UEs according to an example implementation of the present disclosure. Specifically, the concept of a PC5-RRC connection may be different from an RRC Connection in a Uu interface. In an NR PC5 interface, one SL-unicast group (e.g., UE #1 and UE #2 as shown in FIG. 3) may need to build at least one PC5-S connection and each PC5-S connection may be associated with a PC5-RRC connection in the Access Stratum layer (AS layer) independently. In other words, the PC5-S connection and PC5-RRC connection may be one-to-one mapping. Each PC5 RRC connection is a logical connection between a pair of source and destination Layer-2 IDs. In the service level, one PC5-S connection (and so the associated PC5-RRC connection) may be built to serve one or more than one SL operation(s) (e.g., SL operation(s) to support one or more NR/LTE V2X service(s)). In some implementations, for example, the PC5-S connection #1s at the UE #1 and UE #2 are constructed to serve V2X service #1/#2 and the PC5-S connection #2s are constructed to serve V2X service #a/#b. Noticeably, there may be multiple active PC5-S connections/PC5-RRC connections in the paired UEs to support different sets of V2X services which have different QoS requirements. In some implementations, the UE may also report the status of PC5-RRC connections to the serving cell (e.g., a PCell in a master cell group or a PSCell in a secondary cell group) and so the serving RAN may also know the conditions of the PC5-RRC connections on the UE side. In addition, the UE may also report the SL radio link failure event (to at least one PC5-RRC connection) to the serving RAN (e.g., for SL resource management such as Mode 1-like SL resource configuration approach). It is also noted that, a UE may also join multiple SL-unicast groups with different target UEs, and a UE may have PC5-RRC connections which are associated with different UEs.

Sidelink-Discontinuous Reception (SL-DRX)

In some implementations, the MAC entity may be configured by the RRC entity with an SL-DRX functionality that controls the UE's SL packet reception (e.g., Physical Sidelink Control Channel (PSCCH) monitoring) activities and/or the UE's SL packet transmission (e.g., Physical Sidelink Shared Channel (PSSCH) transmission) activities.

If SL-DRX is configured, for all associated SL (e.g., unicast, group-cast and/or broadcast) groups, the MAC entity may monitor the PSCCH discontinuously using the SL-DRX operation. Otherwise, the MAC entity may monitor the PSCCH for SL packet reception. If SL-DRX is configured, for all the associated SL (e.g., unicast, group-cast and/or broadcast) groups, the MAC entity may transmit Sidelink Control Information (SCI) on the configured PSCCH(s) discontinuously using the SL-DRX operation. Specifically, in some implementations, the RRC entity may control the SL-DRX operation by configuring the following parameters:

SL-drx-onDurationTimer: this duration may be at the beginning of an SL-DRX cycle;

SL-drx-SlotOffset: this delay may be before starting the SL-drx-onDurationTimer;

SL-drx-InactivityTimer: this duration may be after the PSCCH occasion in which a PSCCH indicates a new SL transmission/reception for the concerned MAC entity;

drx-RetransmissionTimerSL_Rx (e.g., for each SL-HARQ reception process in which the UE needs to transmit SL-HARQ feedback information to the associated SL-Tx UE): this may be the maximum duration until an SL retransmission is received;

drx-RetransmissionTimerSL_Tx (e.g., per SL-HARQ transmission process in which the UE needs to re-transmit an SL MAC PDU based on the SL-HARQ feedback information replied by at least one SL-Rx UE): this may be the maximum duration until an SL grant for SL retransmission is received;

SL-drx-LongCycleStartOffset: this may include the Long SL-DRX cycle and drx-StartOffset which defines the subframe where the Long or Short SL-DRX cycle starts;

SL-drx-ShortCycle (optional): this may be the Short SL-DRX cycle;

SL-drx-ShortCycleTimer (optional): this may be the duration that the UE may follow in the Short SL-DRX cycle;

drx-HARQ-RTT-TimerSL_Rx (e.g., for each SL-HARQ reception process in which the UE needs to transmit SL-HARQ feedback information to the associated SL-Tx UE): this may be the minimum duration before an SL assignment for SL-HARQ reception is expected by the MAC entity;

drx-HARQ-RTT-TimerSL_Tx (e.g., per SL-HARQ transmission process in which the UE needs to re-transmit an SL MAC PDU based on the SL-HARQ feedback information replied by at least one SL-Rx UE): this may be the minimum duration before an SL-HARQ retransmission grant is expected by the MAC entity.

In some implementations, when an SL-DRX cycle is configured, a (SL-DRX) Active Time (in a PC5 interface) may include the time while:
  the SL-drx-onDurationTimer or SL-drx-InactivityTimer or drx-RetransmissionTimerSL_Tx or drx-RetransmissionTimerSL_Rx is running; or
  an SR for the of SL dynamic grant request is sent on a Physical Uplink Control Channel (PUCCH) (Uu interface) and is pending; or
  a PSCCH indicating one (or more than one) new transmission addressed to (at least) one of the UE's (associated SL source identity, interested SL (Layer 1/Layer 2) destination identity) set of the MAC entity.

In some implementations, when the SL-DRX is configured, the MAC entity may:
  1> if an SL MAC PDU associated with the UE's (associated SL source identity, interested SL destination identity) is received in a configured SL assignment:

2> start the drx-HARQ-RTT-TimerSL_Rx for the corresponding SL-HARQ process in the first symbol after the end of the corresponding transmission carrying the SL-HARQ feedback (e.g., if the UE is configured to transmit SL-HARQ feedback information on the corresponding SL-HARQ process associated with corresponding destination identity);
2> stop the drx-RetransmissionTimerSL_Rx for the corresponding SL-HARQ process.
1> if an SL MAC PDU is transmitted in a configured SL grant:
2> start the drx-HARQ-RTT-TimerSL_Tx for the corresponding SL-HARQ process in the first symbol after the end of the transmission (or the first repetition) of the corresponding PSSCH transmission;
2> stop the drx-RetransmissionTimerSL_Tx for the corresponding SL-HARQ process.
1> if a drx-HARQ-RTT-TimerSL_Rx expires:
2> if the data of the corresponding SL-HARQ process was not successfully decoded:
3> start the drx-RetransmissionTimerSL_Rx for the corresponding SL-HARQ process in the first symbol after the expiry of drx-HARQ-RTT-TimerSL_Rx.
1> if a drx-HARQ-RTT-TimerSL_Tx expires:
2> start the drx-RetransmissionTimerSL_Tx for the corresponding SL-HARQ process in the first symbol after the expiry of drx-HARQ-RTT-TimerSL_Tx.
1> if a DRX command MAC Control Element (CE) (or an SL-DRX Command) or a Long DRX Command MAC CE (or an SL-Long DRX Command MAC CE) is received from the serving cell (through Uu interface) or from other UEs (through a PC5 interface):
2> stop SL-drx-onDurationTimer;
2> stop SL-drx-InactivityTimer.
1> if SL-drx-InactivityTimer expires or a DRX Command MAC CE (or an SL-DRX Command) is received:
2> if the Short SL-DRX cycle is configured:
3> start or restart SL-drx-ShortCycleTimer in the first symbol after the expiry of SL-drx-InactivityTimer or in the first symbol after the end of DRX Command MAC CE (or an SL-DRX Command) reception;
3> use the Short SL-DRX Cycle.
2> else:
3> use the Long SL-DRX cycle.
1> if SL-drx-ShortCycleTimer expires:
2> use the Long SL-DRX cycle.
1> if a Long SL-DRX Command (a Long DRX Command MAC CE) is received:
2> stop SL-drx-ShortCycleTimer;
2> use the Long SL-DRX cycle.
1> if the Short SL-DRX Cycle is used, and [(SFN×10)+ subframe number] modulo (SL-drx-ShortCycle)=(SL-drx-StartOffset) modulo (SL-drx-ShortCycle); or
1> if the Long SL-DRX Cycle is used, and [(SFN×10)+ subframe number] modulo (SL-drx-LongCycle)=SL-drx-StartOffset:
2> start SL-drx-onDurationTimer after SL-drx-SlotOffset from the beginning of the subframe.
1> if the MAC entity is in (SL-DRX) Active Time:
2> monitor the PSCCH (continuously) of one (or more than one) SL frequency carriers;
2> if the PSCCH indicates an SL transmission:
3> start the drx-HARQ-RTT-TimerSL_Rx for the corresponding SL-HARQ process in the first symbol after the end of the corresponding transmission carrying the SL-HARQ feedback;
3> stop the drx-RetransmissionTimerSL_Rx for the corresponding SL-HARQ process.
2> if the UE transmits SCI, which indicates an SL transmission, on one PSCCH:
3> start the drx-HARQ-RTT-TimerSL_Tx for the corresponding SL-HARQ process in the first symbol after the end of the transmission (or the first repetition) of the corresponding PSSCH transmission;
3> stop the drx-RetransmissionTimerSL_Tx for the corresponding SL-HARQ process.
2> if the PSCCH indicates a new SL packet transmission (or indicates SL control signaling) to the UE or the UE transmits SCI on one PSCCH:
3> start or restart SL-drx-InactivityTimer in the first symbol after the end of the associated PSCCH.

In some implementations, the MAC entity may need not to monitor the PSCCH if it is not a complete PSCCH occasion (e.g. the (SL-DRX) Active Time starts or ends in the middle of a PSCCH occasion). It is also noted that, in some implementations, there may be no additional SL-DRX mechanism. In contrast, the UE may adjust SL packet transmission/reception based on the SL-DRX mechanism.

Noticeably, Connected Mode DRX (C-DRX) mechanisms have been applied in the LTE/NR Uu interface for power saving on the UE side. In contrast, in the LTE/NR (V2X) SL operation (e.g., LTE/NR (V2X) SL communication), there is no similar mechanism to reduce the power waste on the UE side. Thus, the SL-DRX mechanism is introduced to include the definitions of SL-DRX Active Time, SL-DRX On-Duration, SL-DRX off-period and the related UE behaviors during the proposed SL-DRX Active Time (SL-DRX On-Duration) as well as the SL-DRX off-period.

Specifically, in some implementations, the mechanisms may be based on the condition that the UE(s) is in the RRC Connected state. Please note that the proposed mechanisms may also be implemented to UEs in the RRC Inactive state and/or RRC Idle state.

In some implementations, the mechanisms may be based on the condition that the UEs may being implementing SL communication under the coverage of serving RAN(s) (e.g., an SL unicast group, an SL multi-cast (group-cast) group and the whole group are under the coverage of the serving RAN(s)). Please note that the mechanisms may also be implemented to the SL unicast/multi-cast groups are out-of-coverage (without an active Uu interface with any RAN) or partial-in-coverage (only a subset of group members in the group have an active Uu interface (e.g., active DL/UL data or signaling exchange through the Uu interface) with their serving RAN).

In some implementations, the mechanisms may be applied based on the NR RAT (e.g., an NR Uu interface and an NR PC5 interface). Noticeably, the mechanisms may also be applicable to other RATs (e.g., an LTE Uu interface and an LTE PC5 interface).

In some implementations, the concept of short-DRX cycle and long-DRX cycle (and the switch between short-DRX cycle/long-DRX cycle) in the C-DRX mechanism may be applicable in the SL-DRX mechanism. Certainly, it may also be possible that only short-DRX cycle(s) or long-DRX cycle(s) may be configured in the SL-DRX mechanism.

In some implementations, an SL-DRX command may be transmitted by the serving RAN (which composes one or more tserving cell(s)/BS(s)/gNB(s)) to the UEs through dedicated control signalings (e.g., PHY signaling (e.g., Downlink Control Information (DCI) through PDCCH), or a MAC CE or dedicated RRC signalings transmitted through a Physical Downlink Shared CHannel (PDSCH)), or any combination of the three signaling methods, through a (LTE/NR) Uu interface.

In some implementations, an SL-DRX command may be transmitted by a UE (e.g., a platoon leader in an SL unicast/group-cast group) to the member UEs through dedicated control signalings (e.g., a MAC CE multiplexed with other SL packets in a PSSCH and/or dedicated PC5-RRC signalings (e.g., through an associated PSSCH), which are transmitted through a PSSCH) through a PC5 interface. In additional embodiments, the SL-DRX command may be delivered through at least one SCI in an associated PSCCH.

SL-DRX Mechanisms

Figure 4:
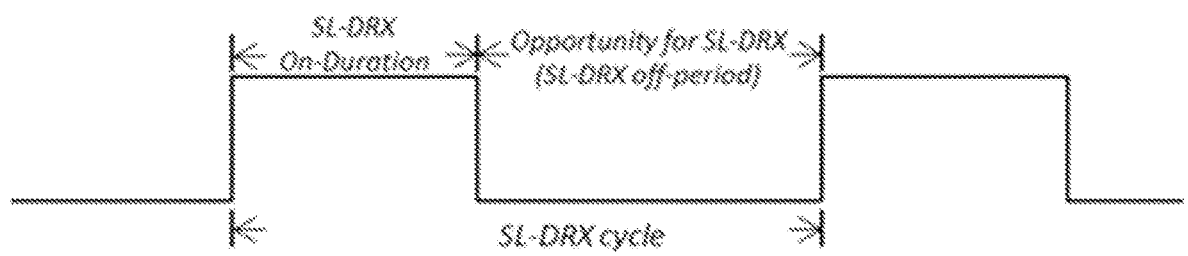
FIG. 4 illustrates an SL-DRX configuration according to an example implementation of the present disclosure.

Referring to FIG. 4, FIG. 4 illustrates an SL-DRX configuration according to an example implementation of the present disclosure. As shown in FIG. 4, in a PC5 interface, the UE may 'wake up' at the beginning of the SL-DRX On-Duration (or from the beginning of the SL-DRX Active Time). Then, the UE may implement the relevant/configured mechanisms during the SL-DRX On-Duration(s). Then, the UE may switch from the SL-DRX On-Duration (or from the SL-DRX Active Time) to the SL-DRX off-period based on one or more defined conditions. In some implementations, the UE may stay within the SL-DRX off-period for a time period, and UE's behaviors for staying in the SL-DRX off-period may also be provided in the following paragraphs. Also, as shown in FIG. 4, the SL-DRX off-period may be terminated while the UE wakes up at the beginning of the next SL-DRX On-Duration.

In details, in one implementation, the meaning of "UE may wake up" implies that the UE may start to monitor control information from the associated physical control channels (e.g., the UE may wake up to monitor SCI(s) (e.g., the 1$^{st}$ stage SCI while two-stage SCI delivery mechanism is applied) from at least one associated PSCCH in a (LTE/NR) PC5 interface and/or the UE may wake up to monitor DCI(s) from (at least) one associated PDCCH(s) in the (LTE/NR) Uu interface). Alternatively, in one implementation, the meaning of "UE may wake up" implies that the UE may stay within DRX (e.g., C-DRX and/or SL-DRX) Active Time(s). Alternatively, in one implementation, the meaning of "UE may wake up" implies that the UE may start a drx-onDurationTimer (and/or an SL-drx-onDurationTimer in a (LTE/NR) PC5 interface). Alternatively, in one implementation, the meaning of "UE may wake up" implies that the UE may (re-)start a drx-onDurationTimer (and/or an SL-drx-onDurationTimer in a (LTE/NR) PC5 interface). Alternatively, in one implementation, the meaning of "UE may wake up" implies that the UE may (re-)start a drx-InactivityTimer (and/or an SL-drx-InactivityTimer in a (LTE/NR) PC5 interface).

In some of the embodiments, as shown in FIG. 4, one SL-DRX cycle may include an SL-DRX On-Duration and a subsequent SL-DRX off-period. The parameters (and the control mechanisms/rules about the UE/RAN behaviors during the SL-DRX Active Times/SL-DRX off-periods in the SL-DRX cycles) for the SL-DRX mechanism (e.g., values of SL-DRX cycle/SL-DRX On-Duration) may be explicitly configured by the serving RAN through broadcasting messages (e.g., SI broadcasting or through SI on-demand procedure) or through dedicated control signaling (e.g., RRC(Connection)Reconfiguration message or other RRC messages, such as RRC(Connection)Release message, RRC(Connection)Release message with suspend configuration, RRC(Connection)Release message without suspend configuration, RRC(Connection)setup message, RRC(Connection)re-establishment message, RRC(Connection)reject message, RRC(Connection)resume message) in (LTE/NR) Uu interface.

In some implementations, the parameters (and the proposed control mechanisms/rules about the UE/RAN behaviors during the SL-DRX Active Times/SL-DRX off-periods in the SL-DRX cycles) for SL-DRX mechanism may be configured by other UEs (e.g., through broadcasting SL-MIB or dedicated PC5-RRC signaling) through a (LTE/NR) PC5 interface. More specifically, the SL-DRX corresponding parameters (e.g., values of SL-DRX cycle/SL-DRX On-Duration) may be configured via a DRX configuration for SL which may be configured per MAC entity and/or cell group (e.g., MCG or SCG). In addition, SL-DRX cycle may include a short SL-DRX cycle and/or a long SL-DRX cycle, and the UE may decide which of the SL-DRX cycles to apply based on pre-defined rules. In some implementations, the parameters (and the proposed control mechanisms/rules about the UE/RAN behaviors during the SL-DRX Active Times/SL-DRX off-periods in the SL-DRX cycles) for the SL-DRX mechanism may be pre-defined as required in the 3GPP TS 38 series specifications or pre-installed in the memory module (e.g., USIM) of the UE side.

It is noted that, in some implementations, (part of) the SL-DRX parameters may be applicable with the C-DRX parameters. For such parameters, as provided for C-DRX in Table 1:

(a) the UE may configure the length of SL-DRX On-Duration=drx-onDurationTimer;
(b) the UE may configure the length of SL-DRX cycle=drx-ShortCycle.
(c) a long DRX cycle-related design may also be applied to an SL-DRX configuration. Moreover, in some of the additional embodiments, the UE may be configured with the long SL-DRX cycle by applying the received drx-LongCycleStartOffset that is received in the DRX-Config.

Moreover, in some implementations, the UE may "wake up" in both a (LTE/NR) Uu interface and a (LTE/NR) PC5 interface simultaneously. For example, one MAC entity of the UE may perform the associated DRX operations for a Uu interface and another MAC entity of the UE may perform the associated SL-DRX operations for a PC5 interface. For another example, a MAC entity of the UE may perform the same DRX operations on both a Uu interface and a PC5 interface jointly (and simultaneously). Then, in some of the embodiments, the UE may transit into DRX off-period in a Uu interface and transit into SL-DRX off-period in a PC5 interface at different timing (e.g., depending on the packet exchange status (or depending on the different DRX operations) in the Uu interface and PC5 interface), respectively.

In some implementations, the UE may be configured with two C-DRX groups with two different sets of parameters. In addition, the SL-DRX mechanism may apply one or more of the parameters from one of the two different sets of parameters, which correspond to one of the two C-DRX groups. The selection between the different sets of parameters may be indicated by the serving RAN (e.g., through dedicated RRC signaling) or other UEs (e.g., through dedicated PC5-RRC signaling) in the same SL unicast/group-cast/broadcast group(s) with the target UE. More specifically, the two C-DRX groups may be configured for the same MAC entity and/or cell group (e.g., MCG/SCG).

TABLE 1

DRX-Config field descriptions (For Uu interfacce)

drx-HARQ-RTT-TimerDL
Value in a number of symbols of the BWP where the transport block is received.
drx-HARQ-RTT-TimerUL
Value in a number of symbols of the BWP where the transport block is transmitted.
drx-Inactivity Timer
Value in multiple integers of 1 ms. For example, ms0 corresponds to 0, ms1 corresponds to 1
ms, ms2 corresponds to 2 ms, and so on.
drx-LongCycleStartOffset
drx-LongCycle in ms and drx-StartOffset in multiples of 1 ms. If drx-ShortCycle is configured,
the value of drx-LongCycle may be a multiple of the drx-ShortCycle value.
drx-onDuration Timer
Value in multiples of $1/32$ ms (sub-milliseconds) or in ms (millisecond). For the latter, for
example, value ms1 corresponds to 1 ms, value ms2 corresponds to 2 ms, and so on.
drx-Retransmission TimerDL
Value in a number of slot lengths of the BWP where the transport block is received. For
example, value sl0 corresponds to 0 slots, sl1 corresponds to 1 slot, sl2 corresponds to 2 slots,
and so on.
drx-Retransmission TimerUL
Value in a number of slot lengths of the BWP where the transport block is transmitted. For
example, sl0 corresponds to 0 slots, sl1 corresponds to 1 slot, sl2 corresponds to 2 slots, and so
on.
drx-ShortCycleTimer
Value in multiples of drx-ShortCycle. For example, a value of 1 corresponds to drx-
ShortCycle, a value of 2 corresponds to 2 * drx-ShortCycle and so on.
drx-ShortCycle
Value in ms. For example, ms1 corresponds to 1 ms, ms2 corresponds to 2 ms, and so on.
drx-SlotOffset
Value in $1/32$ ms. For example, value 0 corresponds to 0 ms, value 1 corresponds to $1/32$ ms,
value 2 corresponds to $2/32$ ms, and so on.

UE Behaviors During SL-DRX Active Time (or SL-DRX On-Duration(s)) or SL-DRX Off-Period(s)

In some implementations, the SL-DRX may have impacts on the UE's behaviors in the following circumstances:

(a) SL Transmission (in a PC5 interface): the UE may stop some implementations of SL packet transmission while the UE stays within an SL-DRX off-period(s). More detailed mechanisms may be presented in the following. In some implementations, the UE may be configured with SL packet transmissions (or shortly called SL packet(s)) through both an LTE PC5 interface and an NR PC5 interface. In some implementations, during the SL-DRX off-periods, the UE may: (1) only stop the SL packet transmission on an LTE PC5 interface (so the SL packet transmission on an NR PC5 interface may be continued during the SL-DRX off-periods), (2) only stop the SL packet transmission on the NR PC5 interface (so the SL packet transmission on the LTE PC5 interface may be continued during the SL-DRX off-periods), or (3) stop the SL packet transmissions on both the LTE PC5 interface and NR PC5 interface.

(b) SL Reception: the UE may stop some implementations of SL packet reception while the UE stays within SL-DRX off-period(s). More detailed mechanisms are discussed below. In some implementations, the UE may be configured with SL packet receptions through both an LTE PC5 interface and an NR PC5 interface. In some implementations, during the SL-DRX off-periods, the UE may: (1) only stop the SL packet reception on the LTE PC5 interface (so the SL packet reception on the NR PC5 interface may be continued during the SL-DRX off-periods), (2) only stop the SL packet reception on the NR PC5 interface (so the SL packet reception on the LTE PC5 interface may be continued during the SL-DRX off-periods), or (3) stop the SL packet transmissions on both the LTE PC5 interface and NR PC5 interface.

(c) SL-Uu related mechanisms to RAN (in (LTE/NR) Uu interface): the UE may stop some implementations of UE reporting to the RAN (through a (LTE/NR) Uu interface) while the UE is staying in SL-DRX off-period(s) or the UE may stop monitoring RAN instructions while the UE is staying in SL-DRX off-period(s). More detailed mechanisms are discussed below. In some implementations, the UE may be configured with an NR Uu interface to support SL resource configurations for both an LTE PC5 interface and an NR PC5 interface (e.g., the BS may configure dynamic SL grant or SL (exceptional) resource pool configurations for the NR PC5 interface, such as PC5 RRC connections. The BS may also configure SL (exceptional) resource pool configurations for the LTE PC5 interface). In some implementations, during the SL-DRX off-periods, the UE may: (1) only stop the SL-Uu related mechanisms associated with the LTE PC5 interface (so the SL-Uu related mechanisms associated with the NR PC5 interface (e.g., one or more PC5 RRC connections) may be continued during the SL-DRX off-periods), (2) only stop the SL-Uu related mechanisms associated with the NR PC5 interface (so the SL-Uu related mechanisms associated with the LTE PC5 interface may be continued during the SL-DRX off-periods), or (3) stop the SL-Uu related mechanisms associated with the LTE PC5 interface and NR PC5 interface.

(d) SL synchronization mechanisms: the UE may stop broadcasting SL-SSB (with or without MIB-SL or MIB-SL-V2X) while the UE is staying in SL-DRX off periods even the UE is configured as a (LTE/NR) SyncRef UE. Then, the UE may broadcast the SL-SSB (with or without MIB-SL or MIB-SL-V2X) again after the UE wakes up at the beginning of the SL-DRX On-Duration (in the next SL-DRX cycle). More detailed mechanisms are discussed below. In some implementations, the UE may be configured as an NR SyncRef UE and an LTE SyncRef UE. In some implementations, during the SL-DRX off-periods, the UE may: (1) only stop the LTE SyncRef UE operation on an LTE PC5 interface (so the NR SyncRef UE operation on an NR PC5 interface may be continued during the SL-DRX off-periods), (2) only stop the NR SyncRef UE operation on the NR PC5 interface (so the LTE SyncRef UE operation on the LTE PC5 interface may be continued during the SL-DRX off-periods), or (3) stop the NR SyncRef UE operation and LTE SyncRef UE operation on both the NR PC5 interface and LTE PC5 interface, respectively, during the SL-DRX off-periods.

(e) SL discovery mechanism: the UE may stop delivering (LTE/NR) SL discovery messages while the UE is staying in SL-DRX off periods. Then, the UE may (re)-start/resume/continue to deliver the (LTE/NR) SL discovery messages again after the UE wakes up at the beginning of the following SL-DRX On-Duration(s). More detailed mechanisms are discussed below. In some implementations, the UE may be configured with LTE SL discovery message delivery and NR SL discovery message delivery. In some implementations, during the SL-DRX off-periods, the UE may: (1) only stop the LTE SL discovery message delivery on an LTE PC5 interface (so the NR SL discovery message delivery on an NR PC5 interface may be continued during the SL-DRX off-periods), (2) only stop the NR SL discovery message delivery on the NR PC5 interface (so the LTE SL discovery message delivery on the LTE PC5 interface may be continued during the SL-DRX off-periods), or (3) stop LTE SL discovery message delivery and NR SL discovery message delivery on the LTE PC5 interface and NR PC5 interface, respectively, during the SL-DRX off-periods.

(f) PC5-RRC connection: In some implementations, the UE may stop SL operation associated with all or a subset of PC5-RRC connections (e.g., SL packet transmission/reception, PC5-RRC signalling transmission/reception, or PC5-S signalling through the associated PC5-RRC connection) configured on the UE side while the UE is staying in SL-DRX off-periods. Then, the UE may (re)-start/resume/continue the SL operation associated with all or a subset of PC5-RRC connections configured on the UE side while the UE is staying in SL-DRX Active Times. In contrast, in some additional implementations, the SL operations associated with SL group-cast/broadcast group (e.g., the UE is not configured with a PC5-RRC connection with the associated target SL destination identity) may still be continued no matter whether the UE is staying in SL-DRX Active Times or SL-DRX off-periods.

Considering the SL transmission mechanism, first of all, it may disclose SCI transmission in a PSCCH and SL packet delivery in the PSSCH. In some implementations, it may define the SL-Tx UE as a UE who wants to transmit SL data packets and/or control signaling to other UEs through the (LTE/NR) PC5 interface. Then, an SL-Rx UE is defined as a UE who wants to receive SL packets and/or control signaling from other UEs through the (LTE/NR) PC5 interface. In some implementations, a UE may be an SL-Tx UE or an SL-Rx UE, and the UE may switch its role between the SL-Tx UE and the SL-Rx UE. In some implementations, a UE may be an SL-Tx UE and an SL-Rx UE at the same time. It is noted that, the SL-Tx UE behaviors may not be limited to those of an SL-Tx UE, but may also include those of an SL-Rx UE. Moreover, the SL-Rx UE behaviors may not be limited to those of an SL-Rx UE, but may also include those of an SL-Tx UE. For example, in one implementation, a sensing procedure in general may be required for SL-TX UEs for transmission. In contrast, an SL-RX UE may also perform the sensing procedure (in the background implementation) since it may act as an SL-TX UE upon requesting to deliver SL packets, which is not limiting the scope of the implementation.

In some implementations, the UE may stop transmitting SCI in configured PSCCH(s) (e.g., the SCI may be regarded as the first stage SCI (or called first SCI) for the two-stage SCI delivery mechanisms) during the SL-DRX off-period(s) (even there is at least one pending SL packet on the UE side and there is available SL resource(s) (pool) during the SL-DRX off-period(s)). Therefore, the UE may not transmit SL packets (with multiplexed De-Modulation Reference Signal (DMRS)) in the PSSCH(s) during the SL-DRX off-periods.

In some implementations, the UE may stop accessing Type 1 SL configured grant(s) while the UE is staying within SL-DRX off-periods. In some implementations, to the RAN side, the serving RAN may re-allocate the SL resource to other UEs. In another implementation, the UE may still access (all or a subset of) Type 1 SL configured grant(s) while the UE is staying within the SL-DRX off-periods.

In some implementations, the UE may stop accessing 'active' Type 2 SL configured grant(s) while the UE is staying in SL-DRX off-periods. In some implementations, to the RAN side, the serving cell may re-allocate the SL resource to other UEs during the SL-DRX off-periods of the UE(s). In another implementation, the UE may still access (all or a subset of) active Type 2 SL configured grant(s) while the UE is staying within the SL-DRX off-periods.

In some implementations, for Mode 2 SL resource configuration, the UE may stop accessing SL pool(s) while the UE is staying in SL-DRX off-periods.

In some implementations, for SL exceptional resource pool(s), the UE may stop accessing SL exceptional resource pool(s) while the UE is staying in SL-DRX off-periods. In some implementations, the UE may keep accessing SL exceptional resource pool(s) while the UE is staying in SL-DRX off-periods.

In some implementations, for SL-HARQ procedure(s), the UE may suspend on-going (or active) SL-HARQ procedure(s) after the UE moving to the SL-DRX off-period. The UE may keep the suspended SL-HARQ procedure(s) (e.g., the UE may suspend all of the active counters/timers associated with the SL-HARQ procedures) while the UE is staying within the SL-DRX off-period. For example, for the SL-HARQ process(es) (e.g., the pending packet and related active SL-HARQ timers associated with one specific SL-HARQ process ID) associated with low priority (e.g., the SL logical channel with high Prose-Per-Packet Priority (PPPP) threshold, such as 7, 8), the SL-HARQ processes with these low priority SL logical channel(s) may be suspended during the SL-DRX off-periods. In addition, a PPPP threshold may be further configured to the UE (e.g., through dedicated (PC5-) RRC signaling or broadcasting SI). The SL assembled MAC PDU provided with an associated PPPP value higher than (and equal to) the given PPPP threshold may be considered as a low priority SL MAC PDU. Then, the SL transmission/reception and/or SL-HARQ processes associated with the low priority MAC PDU may also be suspended during the SL-DRX off-periods. Otherwise, the assembled MAC PDU provided with an associated PPPP value lower than the given PPPP threshold may be considered as a high priority SL logical channel(s). Then, the SL transmission/reception and/or SL-HARQ processes associated with these high priority SL-HARQ processes may not be suspended during the SL-DRX off-periods. In some implementations, the PPPP value of the assembled MAC PDU may be decided by the lowest PPPP value (e.g., the PPPP value of the highest priority) among the logical channels which have pending packets included in the payload of the concerned MAC PDU. Certainly, the implementation and mapping rules of SL logical channels and PPPP threshold may be referred to LTE V2X (SL) communication.

In some implementations, the SL resources may cross one or more than one SL frequency carrier which the UE is configured to transmit SL packets (and SL control signaling, such as PC5-RRC signaling). Under such circumstances, the UE may implement SL-DRX mechanism across multiple SL frequency carriers simultaneously. In addition, in some implementations, the UE may be configured with multiple SL-DRX parameter sets, where each SL-DRX parameter set may be independently applied to a different set(s) of SL frequency carriers (e.g., two SL-DRX parameter sets for SL frequency carriers in FR1 (the frequency carriers under 7 GHZ) and FR2 (the frequency carriers above 7 GHz), respectively).

In some implementations, a subset of SL transmission resource pools may be configured for a UE to transmit SL packets even during the SL-DRX off-periods. For example, a set of SL-DRX-Tx Resource pool configurations may be configured to UEs (e.g., through SL pre-configuration; through dedicated control signaling in a (LTE/NR) Uu interface, such as RRC(Connection)Reconfiguration message; through dedicated signaling in a PC5 interface, such as PC5-RRC signaling; through broadcasting message, such as SI; through SI on-demand procedure). Then, the UE may start to access the SL-DRX-Tx resource pools after the UE moves to the SL-DRX off-periods. Moreover, in some implementations, the SL-DRX-Tx resource pool configuration may further include the SL exceptional resource pool(s), which may be configured for an SL-Tx UE to transmit SL packets when at least one exceptional condition is fulfilled. In some implementations, the SL-DRX-Tx resource pool configurations provided for SL-DRX Active Times/off-periods may not include the SL exceptional resource pool(s). Noticeably, in some implementations, the definition of SL-DRX Active Time may only consider the counting of SL-drx-onDurationTimer. In other words, the UE may transition from SL-DRX On-Durations to SL-DRX off-periods directly after the SL-drx-onDurationTimer expires (and the (SL-DRX) Active Time in a PC5 interface is also finished). Then, within the SL-DRX cycle(s), the UE may apply different sets of SL transmission resources within the SL-DRX On-Durations and SL-DRX off-periods, respectively. In some implementations, separate SL (transmission) resource pool configurations may be configured for SL-DRX On-Durations (or SL-DRX Active Times) and SL-DRX off-periods respectively. In some implementations, the SL (transmission) resource pool configurations configured for SL-DRX On-Durations (or SL-DRX Active Times) and SL-DRX off-periods may be isolated with each other in physical resource block (PRB) allocations. In some implementations, the SL (transmission) resource pool configurations configured for SL-DRX On-Durations (or SL-DRX Active Times) and SL-DRX off-periods may be partially overlapped in PRB allocations.

In some implementations, the UE may stop transmitting PC5-RRC signaling to peer UEs while the UE is staying in SL-DRX off-periods. Then, the PC5-RRC signaling may be stored in the buffer of the SL-Tx UE side. The SL-Tx UE may re-start the PC5-RRC signaling transmission in the next SL-DRX On-Duration. Accordingly, some specific procedures (e.g., SL UE capability enquiry/exchange signaling and SL resource (pool) configuration/enquiry procedures in a PC5 interface) may also be suspended while the UE is staying in PC5 off-periods. Also, the RRC procedures associated with these PC5-RRC signaling may be suspended while the UE is staying in SL-DRX off-periods. Moreover, the active/on-going counters or timers associated with these suspended PC5-RRC procedures may also be suspended during the SL-DRX off-periods. Then, UE may re-count the suspended counters/timers after the UE moves to SL-DRX On-Durations again.

In some implementations, the SL resources for SL transmission may include one or more than one SL frequency carrier, where the UE may monitor for SL packet transmission.

In some implementations, for a UE staying within the SL-DRX off-periods, the UE may decide whether or not to switch to SL-DRX On-Duration (e.g., to start the SL-drx-onDurationTimer after SL-drx-SlotOffset (≥0) from the beginning of the corresponding subframe in a PC5 interface) based on whether or not any pending SL packet(s) (SL control signalling) may exist on the UE side. In other words, the UE may transition from an SL-DRX off-period to an SL-DRX On-Duration (and start the SL-drx-onDuration-Timer (after SL-drx-SlotOffset) from the beginning of the corresponding subframe) at the beginning of an SL-DRX cycle if there is one or more pending SL packets in the buffer. In contrast, the UE may decide to stay in an SL-DRX off-period (and not to start the SL-drx-onDurationTimer after SL-drx-SlotOffset from the beginning of the corresponding subframe) if there exists no pending packet in the buffer.

Second, for considering the SL transmission mechanism, it may disclose the sensing mechanism. In some implementations, an SL-Tx UE may implement SL sensing or a partial sensing mechanism to select target SL resource blocks for SL packet delivery in LTE V2X SL communication and NR SL operation.

In some embodiments, the UE may stop implementing SL sensing or the partial sensing mechanism during the SL-DRX off-periods.

Figure 5A:
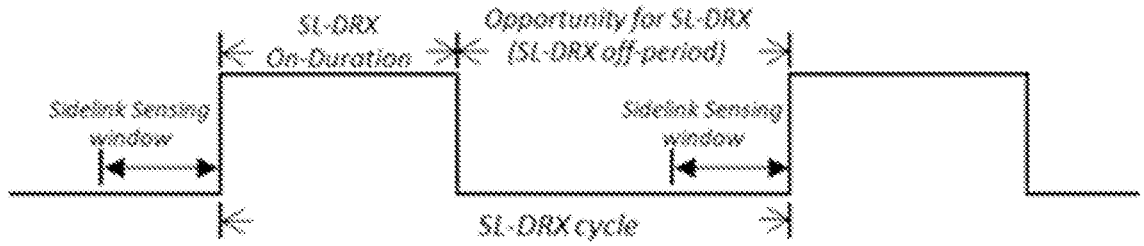
FIGS. 5(a), 5(b) and 5(c) illustrate different Sidelink (SL) sensing windows according to different example implementations of the present disclosure.

Referring to FIG. 5(a), FIG. 5(a) illustrates a sidelink sensing window according to an example implementation of the present disclosure. In some implementations, the UE may be configured with a sidelink sensing window time period during the SL-DRX off-period(s). As shown in FIG. 5(a), before the start of an SL-DRX On-Duration, the UE may start to implement SL sensing or a partial sensing mechanism in advance for the preparation of SL packet delivery in the coming SL-DRX On-Duration.

Based on FIG. 5(a), in some implementations, the UE may monitor and decode the PSCCHs located within the SL sensing window. In some implementations, the UE may not decode SCIs in the PSCCH(s) or PSSCH(s) during the SL sensing window. Instead, the UE may just monitor the received signal strengths (e.g., SL-RSSI) or the received power density (e.g., SL-RSRQ) of the PSCCH(s) (e.g., by detecting each Physical Resource Blocks associated with the PSCCH) or PSSCH(s) in the configured SL sensing window. In some implementations, the UE may monitor a power saving signaling (PSS) (or Wake-Up Signaling (WUS)) in the (LTE/NR) Uu interface for SL during the SL sensing window. Then, the UE may also wake up in the (LTE/NR) PC5 interface after the UE receiving the PSS (or WUS) from the serving cell through a Uu interface.

More specifically, in some implementations, the PSS may be referred to as WUS, PDCCH-WUS, PDCCH-skipping, and/or go-to sleep signaling. The PSS may be scrambled by a specific RNTI (e.g., Power Saving-RNTI (PS-RNTI)). The PSS may include one or more of the following pieces of information: Power saving technique associated with C-DRX (e.g., wake up and/or go to sleep), cross-slot scheduling, triggering Reference Signal transmission, CSI-RS measurement report, single/multi-cell operation, Band-WidthPart information (e.g., BWP ID), Secondary Cell (SCell) information (e.g., SCell ID) Multi-Input Multi-Output (MIMO) layer adaptation (e.g., maximum number of MIMO layer), number of antenna, indication of Control Resource Set (CORESET)/search space/candidate of subsequent PDCCH decoding, PDCCH monitoring periodicity, PDCCH skipping, skipping number of C-DRX monitoring, SPS (Semi-Persistent-Scheduling) activation, C-DRX configuration, C-DRX cycle, etc, which is not limiting the scope of the implementation. The monitoring occasion of PSS may be indicated to the UE by the NW with an offset before and/or at the beginning (e.g., start symbol/slot/subframe) of a C-DRX ON-Duration. The indication to the UE may include explicit signaling by higher layer signaling or implicitly through a CORESET/search space. For example, the serving RAN may configure an offset to the UE. The serving RAN may configure a specific CORESET and/or search space for a PSS. The serving RAN may configure a specific period for the PSS (e.g., the period may be associated with the period of DRX cycle). The UE may monitor the PSS on the offset before and/or at the beginning (e.g., start symbol/slot/subframe) of a C-DRX ON-Duration on the specific CORESET and/or search space. The WUS may have a field to indicate that the UE needs to wake up or not wake up in the coming new C-DRX cycle. Alternatively, the WUS may not have an explicit field/format to indicate that the UE needs to wake up or not. When the UE receives a WUS, it may imply that the serving RAN indicates the UE to wake up (e.g., to monitor the PDCCH on the following C-DRX On-Duration (i.e., so that the UE may start the drx-onDurationTimer at the beginning of the subsequent C-DRX cycle)). If the UE does not receive any WUS on a WUS occasion, it may imply that the serving RAN indicates to the UE not to wake up (e.g., not to monitor the PDCCH(s) and stay in the C-DRX off-periods (i.e., not to start the drx-onDurationTimer at the beginning of the subsequent C-DRX cycle).

In some implementations, the UE may decide whether to initiate the (partial) sensing mechanism in the beginning of an SL sensing window based on whether the UE has pending SL packets in the buffer. For example, the UE may initiate the (partial) sensing mechanism only when there is any pending SL packets on the SL-Tx UE side. In contrast, the UE may not trigger the SL (partial) sensing mechanism and the SL sensing window if the UE does not have pending packets in its buffer. Alternatively, the UE may decide whether to continue monitoring during the sensing window based on a specific indication (e.g., a PSS and/or a WUS), where the specific indication may be indicated during the sensing window.

Figure 5B:
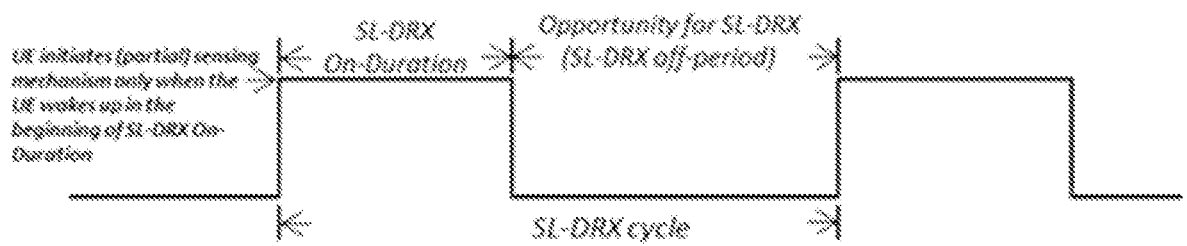

Referring to FIG. 5(b), FIG. 5(b) illustrates another sidelink sensing window according to an example implementation of the present disclosure. Noticeably, as shown in FIG. 5(b), in some implementations, the SL sensing window may be configured as part of an SL-DRX On-Duration. In other words, the UE may initiate an SL (partial) sensing mechanism only when the UE wakes up at the beginning an SL-DRX On-Duration. In addition, the UE may decide whether to transmit SL packets in this SL-DRX On-Duration based on the (partial) sensing results.

Figure 5C:
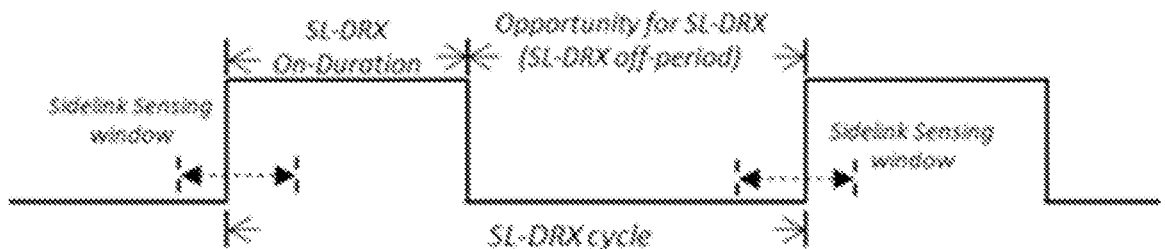

Referring to FIG. 5(c), FIG. 5(c) illustrates another sidelink sensing window according to an example implementation of the present disclosure. As shown in FIG. 5(c), in some implementations, the UE may initiate an SL (partial) sensing mechanism while a new SL packet arrives the buffer on the UE side while the UE is staying in an SL-DRX off-period. In addition, the UE may apply this rule only to new SL packet(s) that belong to specific (pre-configured) SL logical channel(s) (e.g., a logical channel with a high priority, such as SL logical channels associated with low PPPP values/thresholds), some specific PPPP thresholds, or some specific PPPP values.

In some implementations, an SL-Tx UE may be configured to implement either a sensing mechanism or a partial sensing mechanism based on the SL-DRX mechanism. For example, an SL-Tx UE may implement a (partial) sensing mechanism during SL-DRX On-Durations. In contrast, the SL-Tx UE may implement a partial sensing mechanism while the SL-Tx UE is staying in SL-DRX off-periods. In addition, the sensing mechanism may not be interrupted during the transitions between the SL-DRX On-Durations & SL-DRX off-periods. In some implementations, the UE may stop a (partial) sensing mechanism while the UE switches from an SL-DRX On-Duration (or SL-DRX Active Time) to an SL-DRX off-periods or while the UE switches from a C-DRX On-Duration (or C-DRX Active Time) to a C-DRX off-period. In addition, the UE may also release the stored sensing results if the (partial) sensing mechanism is stopped.

Third, the SL transmission mechanism may include a Channel Busy Ratio (CBR) measurement and Channel Occupancy Ratio.

To begin with CBR measurement, in some implementations, the UE may stop implementing CBR measurement during the SL-DRX off-periods. In some implementations, the UE may be configured with another SL CBR window, which also follows the SL sensing window shown in FIG. 5(a) through FIG. 5(c). In some implementations, the CBR measurement may not be interrupted while the UE switches from SL-DRX On-Durations (or SL-DRX Active Times) to SL-DRX off-periods and/or while the UE switches from the SL-DRX off-periods to SL_DRX Active Times (or SL-DRX On-Durations).

Next, for considering Channel Occupancy Ratio, in some implementations, the UE may stop implementing Channel Occupancy Ratio measurement during the SL-DRX off-periods. In some implementations, the UE may be configured with another SL Channel Occupancy window, which also follows the SL Sensing window shown in FIG. 5(a) through FIG. 5(c). In some implementations, the Channel Occupancy Ratio measurement may not be interrupted while the UE switches from SL-DRX On-Durations (or SL-DRX Active Times) to SL-DRX off-periods and/or while the UE switches from SL-DRX off-periods to SL-DRX On-Durations (or SL-DRX Active Times).

Fourth, the SL transmission mechanism may include an SL-BSR procedure. In some implementations, the UEs may exchange SL-BSR(s) through an NR PC5 interface (e.g., through PC5-RRC signaling). In some implementations, one UE may not initiate SL-BSR to neighbor UEs through a PC5 interface while the UE stays within SL-DRX off-periods. In some additional implementations, one on-going procedure may SL-BSR be pended/suspended/postponed/cancelled during SL-DRX off-periods. In some implementations, the UE may still initiate SL-BSR procedure to neighbor UEs through a PC5 interface while the UE stays within SL-DRX off-periods. In addition, an on-going SL-BSR procedure may not be impacted by a switch/transition between SL-DRX On-Durations and SL-DRX off-periods.

Fifth, for the SL transmission mechanism may include an SL-SR procedure. In some implementations, the UEs may initiate an SL-SR procedure with at least one neighboring UE through a PC5 interface (e.g., through PC5-RRC signaling). In some additional implementations, an on-going SL-SR procedure may be pended/suspended/postponed/cancelled during SL-DRX off-periods. In some implementations, a UE may not initiate an SL-SR to neighboring UEs through a PC5 interface while the UE stays within SL-DRX off-periods. In some implementations, the UE may still initiate an SL-SR procedure to neighbor UEs through a PC5 interface while the UE stays within SL-DRX off-periods. In addition, an on-going SL-SR procedure may not be impacted by the switch/transition between SL-DRX On-Durations/SL-DRX off-periods.

Sixth, the SL Transmission mechanism may include a SL-Power Headroom Report (SL-PHR) procedure. In some implementations, the UEs may initiate an SL-PHR procedure with at least one neighboring UE through a PC5 interface (e.g., through PC5-RRC signaling). In some implementations, a UE may not initiate an SL-PHR to neighboring UEs through a PC5 interface while the UE stays within SL-DRX off-periods. In some additional implementations, an on-going SL-PHR procedure may be pended/suspended/postponed/cancelled during SL-DRX off-periods. In some implementations, the UE may still initiate an SL-PHR procedure to neighboring UEs through a PC5 interface while the UE stays within SL-DRX off-periods. In addition, an on-going SL-PHR procedure may not be impacted by the switch/transition between SL-DRX On-Durations/SL-DRX off-periods.

Seventh, the SL transmission mechanism may include one or more exceptional conditions. In some implementations, the UE may break the rules of stopping SL packet transmissions (through SL dynamic grant, Type1 SL configured grant, Type 2 SL configured grant, Mode 2 SL resource pool configuration, or Exceptional resource pool) while at least one exceptional condition happens, such as:

(a) if the T310 or T311 of (NR/LTE) RRC protocols, as commonly known and defined in 3GPP TS 38 series specifications, is running;
(b) if T301 of (NR/LTE) RRC protocols, as commonly known and defined in 3GPP TS 38 series specifications, is running;
(c) if T304 of (NR/LTE) RRC protocols, as commonly known and defined in 3GPP TS 38 series specifications, is running;
(d) when the (partial) sensing result on the SL resource (pools) configured to the UE is not yet available.
(e) from the moment the UE initiates (NR/LTE) an RRC connection (re)establishment/resume until receiving an RRC(Connection)Reconfiguration including an SL resource (pool) configuration or until receiving an RRC(Connection)Release (e.g., RRC(Connection)Release message with/without suspend configuration, which instructs the UE to move to (LTE/NR) RRC INACTIVE state) or an RRC(Connection)Reject message.
(f) if the UE is initiated to transmit a PC5-RRC signaling (e.g., an SL-SR procedure, an SL-BSR procedure, or an SL-PHR procedure) to other UEs through the a PC5 interface or the UE is initiated to transmit an SL SR request procedure, a BSR procedure, or an SL PHR procedure to the UE's serving cell through a (LTE/NR) Uu interface while the UE is staying in the SL-DRX off-periods.

In some implementations, an SL-DRX off-period may be terminated while at least one of the above exceptional conditions happens, then the UE may wake up to transition to the next SL-DRX On-Duration (e.g., the UE may start the SL-drx-onDurationTimer after SL-drx-SlotOffset (≥0) from the beginning of the corresponding subframe in the associated (LTE/NR) PC5 interface).

Turning to SL reception, it may include SCI reception in a PSCCH and SL packet delivery on a PSSCH. In some implementations, the UE may not monitor the first stage SCI (or called the first SCI) on PSCCH(s) and the following associated PSSCH from available SL resources while the UE is staying in the SL-DRX off-periods. The available SL resources may include all of SL reception resource pools. In addition, the UE may neither not monitor second stage SCI(s) (or called second SCI(s)), which may be delivered on a PSSCH, during the SL-DRX off-periods while two-stage SCIs are implemented on the PC5 interface.

It is also noted that the SL reception resource pools may include one or more SL frequency carriers on which the UE may monitor for SL packet reception.

Noticeably, in some implementations, a subset of SL reception resource pools may be configured for a UE to monitor even during the SL-DRX off-periods. For example, one set of SL-DRX-Rx Resource pool configuration may be configured to UEs (e.g., through SL pre-configuration; through dedicated control signaling in a Uu interface, such as RRC(Connection)Reconfiguration message; through dedicated signaling in a PC5 interface, such as PC5-RRC signaling; through broadcasting message, such as SI; through SI on-demand procedure). Then, the UE may start to monitor the SL-DRX-Rx Resource pools after the UE moves to the SL-DRX off-periods. Then, the UE may monitor the whole configured SL reception resource pools after the UE moves to the SL-DRX On-Duration in the next SL-DRX cycle. Moreover, in some implementations, the proposed SL-DRX-Rx resource pool configuration may further include the SL exceptional resource pool(s), which is configured for an SL-Tx UE to transmit SL packets when at least one of the above exceptional conditions is fulfilled. It is also worthy to note that, in some implementations, the definition of SL-DRX Active Time may only consider the counting of the SL-drx-onDurationTimer. In other words, the UE may transition from SL-DRX On-Durations to SL-DRX off-periods directly after the SL-drx-onDurationTimer expires (and the (SL-DRX) Active Time in a PC5 interface is also finished). Then, within SL-DRX cycles, the UE may apply different sets of SL reception resource pools within SL-DRX On-Durations or SL-DRX off-periods. It is also noted that, in some implementations, the SL reception resource pool(s) for SL-DRX On-Durations and SL-DRX off-periods may be configured independently and isolated from PRB allocations. In some implementations, the SL reception resource pool(s) for SL-DRX On-Durations and SL-DRX off-periods may be (partially) overlapped with PRB allocations.

Turning to SL-Uu related mechanisms to RAN, first of all, it may include SL dynamic grant monitoring. In some implementations, the UE may not monitor PDCCHs (or search spaces/CORESETs configured for SL dynamic grant (s) receptions) (e.g., for SL dynamic grant(s) reception) while the UE is staying in the SL-DRX off-period(s). So, the UE may not try to decode the PDCCHs by using the RNTI (e.g., SL-RNTI/sl-RNTI) configured for the SL dynamic grant(s) reception. In some implementations, the UE may still monitor PDCCHs from the serving RAN during the (SL-DRX) Active Time of a Uu interface even when the UE is staying in SL-DRX off-periods in a PC5 interface. In some implementations, the UE may not monitor PDCCHs only when the UE is staying in the SL-DRX off-period(s) and C-DRX off-periods.

Second, the SL-Uu related mechanisms to RAN may include SL (Type 2) Configured Grant Activation/De-activation. In some implementations, the UE may not monitor PDCCHs (e.g., if the UE is configured with Type 2 SL configured grant, the UE may not monitor PDCCHs for SL configured grant activation/de-activation from the serving RAN) while the UE is staying in the SL-DRX off-period(s). Accordingly, the UE may not try to decode the PDCCHs by using the RNTI configured for the activation/de-activation of SL configured grant(s) (e.g., SL-CS-RNTI/sl-CS-RNTI). In some implementations, the UE may still monitor the PDCCHs (or search spaces/CORESETs configured for SL configured grant(s) (de) activations) (e.g., for SL configured grant activation/de-activation from the serving RAN) during the (SL-DRX) Active Time of a Uu interface even when the UE is staying in SL-DRX off-periods in a PC5 interface. In some implementations, the UE may not monitor PDCCHs/search spaces/CORESETs (e.g., for SL configured grant activation/de-activation from the serving RAN) only while the UE is staying in the SL-DRX off-period(s) and C-DRX off-periods.

Third, the SL-Uu related mechanisms to RAN may include an SL-SR (Uu interface) for SL packet delivery. In some implementations, the UE may not trigger an SL-SR procedure(s) for the SL logical channel(s) to the serving RAN (e.g., through a Uu interface) while the UE is staying in SL-DRX off-periods. In some implementations, the UE may still trigger SL-SR procedure(s) for the SL LCH(s) to the serving RAN during the (SL-DRX) Active Time of a Uu interface even when the UE is staying in SL-DRX off-periods in a PC5 interface. In some implementations, the UE may not initiate an SL SR to the UE's serving cell through a Uu interface while the UE stays within the C-DRX off-periods (and/or SL-DRX off-periods). In some implementations, the UE may suspend/stop/release/delete/remove all or a subset of on-going SL-SR procedures associated with the serving RAN on the (LTE/NR) Uu interface during the SL-DRX off-periods.

Fourth, the SL-Uu related mechanisms to RAN may include an SL-BSR (Uu interface) for SL packet delivery. In some implementations, the UE may not trigger an SL-BSR procedure(s) to report BSRs of SL LCH(s) to the serving RAN while the UE is staying in SL-DRX off-periods. In some implementations, the UE may still report BSRs of SL LCH(s) to the serving RAN during the (SL-DRX) Active Time of a Uu interface even when the UE is staying in SL-DRX off-periods in a PC5 interface. In some implementations, the UE may not initiate an SL-BSR to the UE's serving cell through a Uu interface while the UE stays within the C-DRX off-periods (and/or SL-DRX off-periods). In some implementations, the UE may suspend/stop/release/delete/remove all or a subset of on-going SL-BSR procedures associated with the serving RAN on the (LTE/NR) Uu interface during the SL-DRX off-periods.

Fifth, the SL-Uu related mechanisms to RAN may include an SL-PHR (Uu interface) for SL packet delivery. In some implementations, the UE may not trigger an SL-PHR procedure(s) to report the PHRs to the serving RAN while the UE is in SL-DRX off-periods. In some implementations, UE may still trigger an SL-PHR procedure(s) to the serving RAN during the (SL-DRX) Active Time of aUu interface even when the UE is staying in SL-DRX off-periods in a PC5 interface. In some implementations, the UE may not initiate an SL-PHR to the UE's serving cell through a Uu interface while the UE stays within the C-DRX off-periods (and/or SL-DRX off-periods). In some implementations, the UE may suspend/stop/release/delete/remove all or a subset of on-going SL-PHR procedures associated with the serving RAN on the (LTE/NR) Uu interface during the SL-DRX off-periods.

Sixth, the SL-Uu related mechanisms to RAN may include SL-HARQ feedback information in a Uu interface. In some implementations, the UE may not transmit SL-HARQ feedback information to the serving RAN while the UE is staying in SL-DRX off-periods. In some implementations, the UE may still transmit SL-HARQ feedback to the serving RAN during the (SL-DRX) Active Time of a Uu interface even when the UE is staying in SL-DRX off-periods in a PC5 interface. In some implementations, the UE may not transmit SL-HARQ feedback information to the serving RAN only while the UE is staying in the C-DRX off-period(s) (and/or SL-DRX off-periods). In some implementations, the UE may suspend/stop/release/delete/remove all or a subset of on-going SL-HARQ feedback procedures associated with the serving RAN on the (LTE/NR) Uu interface during the SL-DRX off-periods.

Turning to SL synchronization mechanisms, an SL synchronization mechanism may include SL synchronization sequence delivery. In some implementations, the UE may become a SyncRef UE, which broadcasts SL synchronization messages (e.g., SL Synchronization Sequence block set (SL-SSB set) and SL-MIB/SL-MIB-V2X) continuously. In some implementations, the UE may stop/suspend/postpone/stop/release/delete/remove transmitting SL synchronization messages while the UE is staying in SL-DRX off-periods. Then, the UE may transmit SL synchronization messages continuously after the UE moves to SL-DRX On-Duration again. In some implementations, the SyncRef UE may keep broadcasting SL-SSB set and its associated SL-MIB/SL-MIB-V2X (e.g., through PSBCHs) continuously without being impacted by the transitions between SL-DRX On-Durations and SL-DRX off-periods.

Turning to SL discovery, it may first include an SL discovery message transmission mechanism. In some implementations, concerning (LTE/NR) SL discovery mechanism, a UE may be configured to transmit/receive SL discovery messages. The contents of SL discovery messages may be provided by the upper layers (e.g., the application layer/V2X layer). The SL discovery messages may be transmitted in specific Physical Sidelink Discovery CHs (PSDCHs) or in common PSSCHs. In some implementations, (e.g., for some commercial SL discovery services), a UE may stop transmitting SL discovery messages while the UE is staying in SL-DRX off-periods. Then, the UE may re-transmit SL discovery messages continuously after the UE moves to SL-DRX On-Duration (or SL-DRX Active Time) again. In some implementations, if the SL discovery messages is for specific services (e.g., for public safety services), the UE may keep delivering SL discovery messages continuously without being impacted by the switch/transition between SL-DRX On-Durations and SL-DRX off-periods.

Second, the SL discovery may include an SL discovery message reception mechanism. In some implementations (e.g., for some commercial SL discovery services), a UE may stop/suspend/postpone/delete/remove/release monitoring SL discovery messages while the UE is staying in SL-DRX off-periods. Then, the UE may start to monitor SL discovery messages continuously again after the UE moves to an SL-DRX On-Duration again. In some implementations, if the SL discovery messages are for specific services (e.g., for public safety services), the UE may keep monitoring SL discovery messages continuously without being impacted by the switch/transition between SL-DRX On-Durations and SL-DRX off-periods.

Counters/Timers Related to SL-DRX Mechanisms

In some implementations, it may include more details of UE behaviors in the following circumstances:
  (a) UE behaviors to trigger the UE for switching from the SL-DRX off-period to the SL-DRX On-Duration;
  (b) UE behaviors while the UE is staying in the SL-DRX On-Duration(s);
  (c) UE behaviors to trigger the UE for switching from the SL-DRX On-Duration (or SL-DRX Active Time) to the SL-DRX Off-periods;
  (d) UE behaviors while the UE is staying in the SL-DRX Active Time (for Uu interface and/or for PC5 interface).

Specifically, more detailed UE behaviors during an SL-DRX On-Duration may be presented in the following. On the UE side, an RRC sublayer may control SL-DRX operation by configuring the following parameters:
  SL-drx-onDurationTimer: this may be the duration at the beginning of an SL-DRX cycle;
  SL-drx-SlotOffset: this may be the delay before starting the SL-drx-onDurationTimer;
  SL-drx-InactivityTimer: this may be the duration after the PSCCH occasion in which a PSCCH indicates a new SL transmission or reception for the concerned MAC entity;
  drx-RetransmissionTimerSL_Rx (e.g., for each SL-HARQ reception process in which the UE needs to transmit SL-HARQ feedback information to the associated SL-Tx UE): this may be the maximum duration until an SL retransmission is received;
  drx-RetransmissionTimerSL_Tx (e.g., per SL-HARQ transmission process in which the UE needs to retransmit an SL MAC PDU based on the SL-HARQ feedback information replied by at least one SL-Rx UE): this may be the maximum duration until an SL grant for SL retransmission is received;
  SL-drx-LongCycleStartOffset: this may include the Long SL-DRX cycle and drx-StartOffset which defines the subframe where the Long or Short SL-DRX cycle starts;
  SL-drx-ShortCycle (optional): this may be the Short SL-DRX cycle;
  SL-drx-ShortCycleTimer (optional): this may be the duration the UE may follow in the Short SL-DRX cycle;
  drx-HARQ-RTT-TimerSL_Rx (e.g., for each SL-HARQ reception process in which the UE needs to transmit SL-HARQ feedback information to the associated SL-Tx UE): this may be the minimum duration before an SL assignment for SL-HARQ reception is expected by the MAC entity;
  drx-HARQ-RTT-TimerSL_Tx (e.g., per SL-HARQ transmission process in which the UE needs to re-transmit an SL MAC PDU based on the SL-HARQ feedback information replied by at least one SL-Rx UE): this may be the minimum duration before an SL-HARQ retransmission grant is expected by the MAC entity.

In some implementations, the UE may receive the configured values of the above parameters through the following: through SL pre-configuration; through dedicated control signaling in a (LTE/NR) Uu interface, such as an RRC (Connection)Reconfiguration message; through dedicated signaling in a (LTE/NR) PC5 interface, such as PC5-RRC signaling; through broadcasting message, such as SI (e.g., (NR/LTE) V2X specific SIB) in a Uu interface; through SI on-demand procedure in a Uu interface).

In some implementations, when an SL-DRX cycle is configured in a PC5 interface, the (SL-DRX) Active Time in the PC5 interface may include the time while:
  SL-drx-onDurationTimer, SL-drx-InactivityTimer, drx-RetransmissionTimerSL_Tx, or drx-RetransmissionTimerSL_Rx is running; or
  an SR for the SL dynamic grant request is sent on a PUCCH (Uu interface) and is pending; or
  a PSCCH indicating one or more new transmissions addressed to at least one of the UE's (associated SL source identity, interested SL destination identity) sets of the MAC entity.

Considering the SL-drx-onDurationTimer, first of all, in some implementations, it may disclose that UE may start to count the SL-drx-onDurationTimer (e.g., after SL-drx-SlotOffset from the beginning of the subframe) while the UE wakes up at the beginning of an SL-DRX On-Duration.

In some implementations, considering the SL-drx-onDurationTimer again, it may disclose that UE may stop counting the SL-drx-onDurationTimer if a (SL) DRX command MAC CE (or an SL-DRX Command) or a Long DRX Command MAC CE (or an SL-Long DRX Command MAC CE) is received from the serving cell. Noticeably, in some implementations, the UE may receive the (SL) DRX Command MAC CE or SL-DRX Command from the serving RAN through a (LTE/NR) Uu interface. In some implementations, the UE may receive a DRX Command MAC CE or SL-DRX Command from the other UEs (e.g., platoon leader or an SL scheduler) through a (LTE/NR) PC5 interface. In some implementations, the SL-DRX Command or SL-Long DRX Command in the (LTE/NR) PC5 interface may be included in one or more PC5-RRC signalings or SCI(s) between UEs.

In some implementations, considering the SL-drx-onDurationTimer again, the UE may start an SL-drx-onDurationTimer after an SL-drx-SlotOffset from the beginning of the subframe if the Long SL-DRX Cycle is applied, and [(SFN× 10)+subframe number] modulo (SL-drx-LongCycle)=SL-drx-StartOffset in the associated (LTE/NR) PC5 interface. It is also noted that the subframe number may be associated with a subframe number that the UE obtains from the serving RAN through a (LTE/NR) Uu interface, or may be associated with a subframe umber that the UE obtains from other UEs through a (LTE/NR) PC5 interface.

Second, the SL-drx-InactivityTimer, in some implementations, the UE may monitor the PSCCH (continuously) for one or more SL frequency carriers if the MAC entity is in PC5 Active Time (or also called SL-DRX Active Time). In some implementations, the SL-DRX off-periods may also be called as PC5 off-periods. Then, if one monitored PSCCH indicates a new SL packet transmission (or indicates SL control signaling) to the UE or the UE transmits SCI on a PSCCH, the UE may start or restart the SL-drx-InactivityTimer in the first symbol after the end of the associated PSCCH.

Also, to the UE side, the mechanism/operation may be described in the following:
  1> if SL-drx-InactivityTimer expires or a DRX Command MAC CE (or an SL-DRX Command) is received:
    2> if the Short SL-DRX cycle is configured:
      3> start or restart SL-drx-ShortCycleTimer in the first symbol after the expiry of SL-drx-Inactivity- Timer or in the first symbol after the end of DRX Command MAC CE (or an SL-DRX Command) reception;
    3> use the Short SL-DRX Cycle (also the UE may switch to the SL-DRX off-period from the SL-DRX On-Duration or SL-DRX Active Time).
2> else:
    3> use the Long SL-DRX cycle (also the UE may switch to the SL-DRX off-period from the SL-DRX On-Duration or SL-DRX Active Time).

Again, considering the SL-drx-InactivityTimer, in some implementations, the UE may stop counting the SL-drx-InactivityTimer if a DRX command MAC CE (or an SL-DRX Command) or a Long DRX Command MAC CE (or an SL-Long DRX Command MAC CE) is received from the serving cell. It is also noted that, in some implementations, the UE may receive the DRX Command MAC CE or SL-DRX Command from the serving RAN through a (LTE/NR) Uu interface. In some implementations, the UE may receive the DRX Command MAC CE or SL-DRX Command from the other UEs (e.g., a platoon leader or an SL scheduler) through a (LTE/NR) PC5 interface. In some implementations, the SL-DRX Command or SL-Long DRX Command in the (LTE/NR) PC5 interface may be included in one or more PC5-RRC signalings between UEs.

Third, considering the drx-HARQ-RTT-TimerSL_Rx and drx-RetransmissionTimerSL_Rx, it may first configure the following operation/mechanism, in some implementations, to the UE side, if the MAC entity is in (SL-DRX) Active Time:
    2> then the UE may monitor the PSCCH (continuously) of one (or more than one) SL frequency carriers;
    2> if the one received PSCCH indicates an SL transmission:
        3> the UE may start the drx-HARQ-RTT-TimerSL_Rx for the corresponding SL-HARQ process in the first symbol after the end of the corresponding UE transmission carrying the SL-HARQ feedback (also note, in some implementations, the UE may not start the drx-HARQ-RTT-TimerSL_Rx if the UE is not configured to transmit SL-HARQ feedback to the corresponding SL destination identity);
        3> then the UE may stop the drx-RetransmissionTimerSL_Rx for the corresponding SL-HARQ process.

In some implementations, considering the drx-HARQ-RTT-TimerSL_Rx and drx-RetransmissionTimerSL_Rx again, on the UE side, when SL-DRX is configured, the MAC entity may:
    1> if an SL MAC PDU associated with the UE's (associated SL source identity, interested SL destination identity) is received in a configured SL assignment:
        2> UE may start the drx-HARQ-RTT-TimerSL_Rx for the corresponding SL-HARQ process in the first symbol after the end of the corresponding transmission carrying the SL-HARQ feedback (e.g., if the UE is configured to transmit SL-HARQ feedback information on the corresponding SL-HARQ process associated with corresponding destination identity);
        2> Then, the UE may stop the drx-RetransmissionTimerSL_Rx for the corresponding SL-HARQ process.

In some implementations, considering the drx-HARQ-RTT-TimerSL_Rx and drx-RetransmissionTimerSL_Rx again, on the UE side, when SL-DRX is configured, the MAC entity may:
    1> if the drx-HARQ-RTT-TimerSL_Rx expires and if the data of the corresponding SL-HARQ process is not successfully decoded:
        3> UE may start the drx-RetransmissionTimerSL_Rx for the corresponding SL-HARQ process in the first symbol after the expiry of drx-HARQ-RTT-TimerSL_Rx.

Fourth, considering the drx-HARQ-RTT-TimerSL_Tx and drx-RetransmissionTimerSL_Tx, it may configure, in some implementations, to the UE side, if an SL MAC PDU is transmitted in a configured sidelink grant, the following operations/mechanisms:
    2> UE may start the drx-HARQ-RTT-TimerSL_Tx for the corresponding SL-HARQ process in the first symbol after the end of the transmission (or first repetition) of the corresponding PSSCH transmission.
    2> Then, the UE may stop the drx-RetransmissionTimerSL_Tx for the corresponding SL-HARQ process.

In some implementations, considering the drx-HARQ-RTT-TimerSL_Tx and drx-RetransmissionTimerSL_Tx again, on the UE side, if a drx-HARQ-RTT-TimerSL_Tx expires, it may render the following operations/mechanisms:
    2> UE may start the drx-RetransmissionTimerSL_Tx for the corresponding SL-HARQ process in the first symbol after the expiry of drx-HARQ-RTT-TimerSL_Tx.

In some implementations, considering the drx-HARQ-RTT-TimerSL_Tx and drx-RetransmissionTimerSL_Tx again, on the UE side, if the MAC entity is in (PC5) (SL-DRX) Active Time and if the UE transmits SCI, which indicates an SL transmission, on a PSCCH, it may render the following operations/mechanisms:
    3> UE may start the drx-HARQ-RTT-TimerSL_Tx for the corresponding SL-HARQ process in the first symbol after the end of the first repetition of the corresponding PSSCH transmission; and
    3> Then, UE may stop the drx-RetransmissionTimerSL_Tx for the corresponding SL-HARQ process.

Fifth, considering the SL-drx-ShortCycle and SL-drx-ShortCycleTimer in some implementations, to a UE staying in an SL-DRX On-Duration, it may render the following operations/mechanisms:
    1> if SL-drx-InactivityTimer expires or a DRX Command MAC CE (or an SL-DRX Command) is received:
        2> if the Short SL-DRX cycle is configured:
            3> UE may start or restart SL-drx-ShortCycleTimer in the first symbol after the expiry of SL-drx-InactivityTimer or in the first symbol after the end of DRX Command MAC CE (or an SL-DRX Command) reception;
            3> Then, the UE may use the Short SL-DRX Cycle (note: and so the UE may move to the SL-DRX off-period).
        2> else:
            3> use the Long SL-DRX cycle (note: and so the UE may move to the SL-DRX off-period).
    1> if SL-drx-ShortCycleTimer expires:
        2> use the Long SL-DRX cycle (note: and so the UE may be still in the SL-DRX off-period).
    1> if a Long SL-DRX Command (a Long DRX Command MAC CE) is received:
        2> stop SL-drx-ShortCycleTimer;
        2> use the Long SL-DRX cycle (note: and so the UE may move to the SL-DRX off-period).

In some implementations, considering the SL-drx-ShortCycle and SL-drx-ShortCycleTimer again, when the UE is staying in an SL-DRX off-period, it may render the following operations/mechanisms:
    1> if the Short SL-DRX Cycle is used, and [(SFN×10)+ subframe number] modulo (SL-drx-ShortCycle)=(SL-drx-StartOffset) modulo (SL-drx-ShortCycle); or 1> if the Long SL-DRX Cycle is used, and [(SFN×10)+ subframe number] modulo (SL-drx-LongCycle)=SL-drx-StartOffset:
  2> start SL-drx-onDurationTimer after SL-drx-SlotOffset from the beginning of the subframe (note: and so the UE may move to SL-DRX On-Duration).

Furthermore, in some implementations, the UE may wake up in a (LTE/NR) PC5 interface and a (LTE/NR) Uu interface simultaneously (e.g., the UE may follow the C-DRX mechanism to decide whether to wake up in both the Uu interface and PC5 interface). In addition, in some implementations, the UE may keep a (LTE/NR) PC5 interface in (SL-DRX) Active Time during the (SL-DRX) Active Time in the associated (LTE/NR) Uu interface (e.g., drx-onDurationTimer or drx-InactivityTimer or drx-RetransmissionTimerDL or drx-RetransmissionTimerUL is running in the associated Uu interface). Thus, under certain conditions, the UE may:

start SL-drx-onDurationTimer when drx-onDurationTimer is started (or vice versa).

start SL-drx-InactivityTimer when drx-InactivityTimer is started (or vice versa).

Also, in some implementations, the UE may switch/transit to C-DRX off-period and SL-DRX off-period in a PC5 interface as well as a Uu interface simultaneously (e.g., the UE may follow the C-DRX mechanism to decide whether to transit to C-DRX/SL-DRX off-period in both the Uu interface and PC5 interface jointly).

The UE behaviors to implement an SL-DRX mechanism are discussed in the above-mentioned implementations. In some implementations, the UE may transmit an indicator to the serving cell (e.g., through UEAssistanceInformation transmission or through UE Capability Enquiry procedure through a (LTE/NR) Uu interface) to indicate that the UE supports the SL-DRX mechanism or the UE does not support the SL-DRX mechanism. In some implementations, the default setting is UE does (not) support the SL-DRX mechanism. In addition, the UE's capability for SL-DRX support may be stored in the UE AS (Inactive) Context on the UE side and the RAN side. In certain UE mobility events (e.g., (inter-RAT, intra-RAT or inter-system) handover procedure, MCG/SCG add/change, RAN Notification Area Update), the UE's capability of SL-DRX support may be transmitted through an inter-node message (e.g., through Xn interface or X2 interface in backhaul connections) as part of the UE AS (Inactive) Context. In some implementations, the UE may also report its capability of SL-DRX support (or not) to other UEs through one or more PC5 interfaces (e.g., PC5-RRC signaling), which is not limiting the scope of the implementations.

Figure 6:
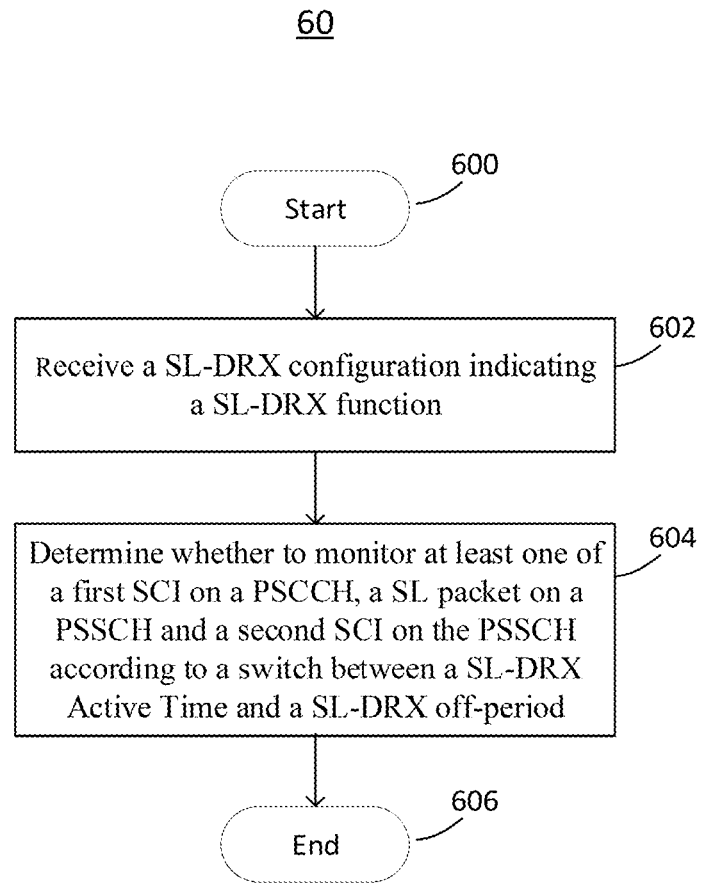
FIG. 6 illustrates an SL packet exchange procedure performed by a first UE according to an example implementation of the present disclosure.

FIG. 6 illustrates an SL packet exchange procedure 60 performed by a first UE according to an example implementation of the present disclosure. As illustrated in FIG. 6, the SL packet exchange procedure 60 for the first UE includes the following actions:

Action 600: Start.

Action 602: the first UE may receive an SL-DRX configuration indicating an SL-DRX function.

Action 604: the first UE may determine whether to monitor at least one of a first SCI on a PSCCH, an SL packet on a PSSCH and a second SCI on the PSSCH according to a switch between an SL-DRX Active Time and an SL-DRX off-period.

Action 606: End.

Preferably, actions 602 and 604 of the SL packet exchange procedure 60 may be configured to the first UE. Specifically, in some implementations, the first UE may receive an SL-DRX configuration indicating the SL-DRX function in action 602. Next, in action 604, the first UE may determine whether to monitor at least one of the first SCI (also called first stage SCI) on the PSCCH, the SL packet on the following PSSCH and the second SCI (also called second stage SCI) on the following PSSCH according to the switch between the SL-DRX Active Time (or the SL-DRX On-Duration) and the SL-DRX off-period, where the SCI may be from at least one second UE. Both the SL-DRX Active Time (or the SL-DRX On-Duration) and the SL-DRX off-period may be decided by the SL-DRX function, and the SL transmission may be transmitted through a PC5 interface controlled by an NR technology or an LTE technology. In some implementations, the first UE may be associated with the second UE in one of an SL unicast group, an SL group-cast group and an SL broadcast group. In some implementations, the SL unicast group, the SL group-cast group or the SL broadcast group may be in-coverage with at least one serving cell in the serving RAN, partial-in-coverage with at least one cell in the serving RAN or out of coverage of the serving RAN.

In some implementations, the SL packet exchange procedure 60 may further configure the first UE to determine whether to transmit the at least one of the first SCI (or $1^{st}$ stage SCI) on the PSCCH and the second SCI (or $2^{nd}$ stage SCI)/SL packet on the following PSSCH according to the switch between the SL-DRX Active Time (or the SL-DRX On-Duration) and the SL-DRX off-period. In some implementations, the SL packet exchange procedure 60 may further configure the first UE to determine whether to transmit at least one SL-BSR to a first serving cell for an SL resource request or to monitor at least one DCI from a second serving cell for an SL resource configuration according to the switch between the SL-DRX Active Time (or the SL-DRX On-Duration) and the SL-DRX off-period by the first UE, where the first serving cell may be an NR cell of an NR Uu interface or ab E-UTRA cell in an E-UTRA Uu interface. In some implementations, the SL packet exchange procedure 60 may further configure the first UE to determine whether to trigger at least one of an SL-SR procedure, an SL-BSR procedure and an SL-PHR procedure to at least one second UE on a PC5 interface according to the switch between the SL-DRX Active Time (or the SL-DRX On-Duration) and the SL-DRX off-period.

In some implementations, the first UE may be configured with different SL resource pool configurations in the SL-DRX On-Duration, in the SL-DRX Active Time or in the SL-DRX off-period for the SL packet exchange operation with the at least one second UE, where the SL resource pool configurations may include at least one of an SL Transmission resource pool configuration, an SL Reception resource pool configuration, an exceptional resource pool configuration, an SL resource pool configuration for SL discovery message transmission, an SL dynamic grant (i.e. one or more SL dynamic grants), a Type-1 SL configured grant (i.e. one or more Type-1 SL configured grants), a Type-2 SL configured grant (i.e. one or more Type-2 SL configured grants) and an SL synchronization signal burst set (i.e. one or more SL synchronization signal burst sets), and the SL resource pool configuration may be among an NR PC5 interface and an E-UTRA PC5 interface. In some implementations, the first UE may be configured to switch between the SL-DRX Active Time (or the SL-DRX On-Duration) and the SL-DRX off-period according to at least one of an SL-DRX-onDurationTimer, an SL-DRX-SlotOffset, an SL-DRX-InactivityTimer, a DRX-RetransmissionTimerSL (e.g., including drx-RetransmissionTimerSL_Rx and/or drx-RetransmissionTimerSL_Tx), an SL-DRX-LongCycleStart-Offset, an SL-DRX-ShortCycle, an SL-DRX-ShortCycleTimer and a DRX-HARQ-RTT-TimerSL (e.g., drx-HARQ-RTT-TimerSL_Rx and/or drx-HARQ-RTT-TimerSL_Tx).

In some implementations, the first UE may be configured to receive the SL-DRX configuration through at least one of an SL pre-configuration, a PC5-RRC signaling of another paired UE, a broadcasting SI of a serving cell in a Uu interface and a UE-specific DL RRC signaling in the Uu interface. In some implementations, the first UE may be configured to perform a CBR measurement and a sensing mechanism according to different SL resource pool configurations in the SL-DRX Active Time (or the SL-DRX On-Duration) or in the SL-DRX off-period. It is noted that the first UE and the second UE may only be depicted as exemplary implementation to form two different devices/apparatuses exchanging SL packet(s), and the SL packet exchange procedure 60 may also be configured to the second UE for all above operations/mechanisms for exchanging SL packet(s) with the first UE, which is not limiting the scope of the implementations.

Figure 7:
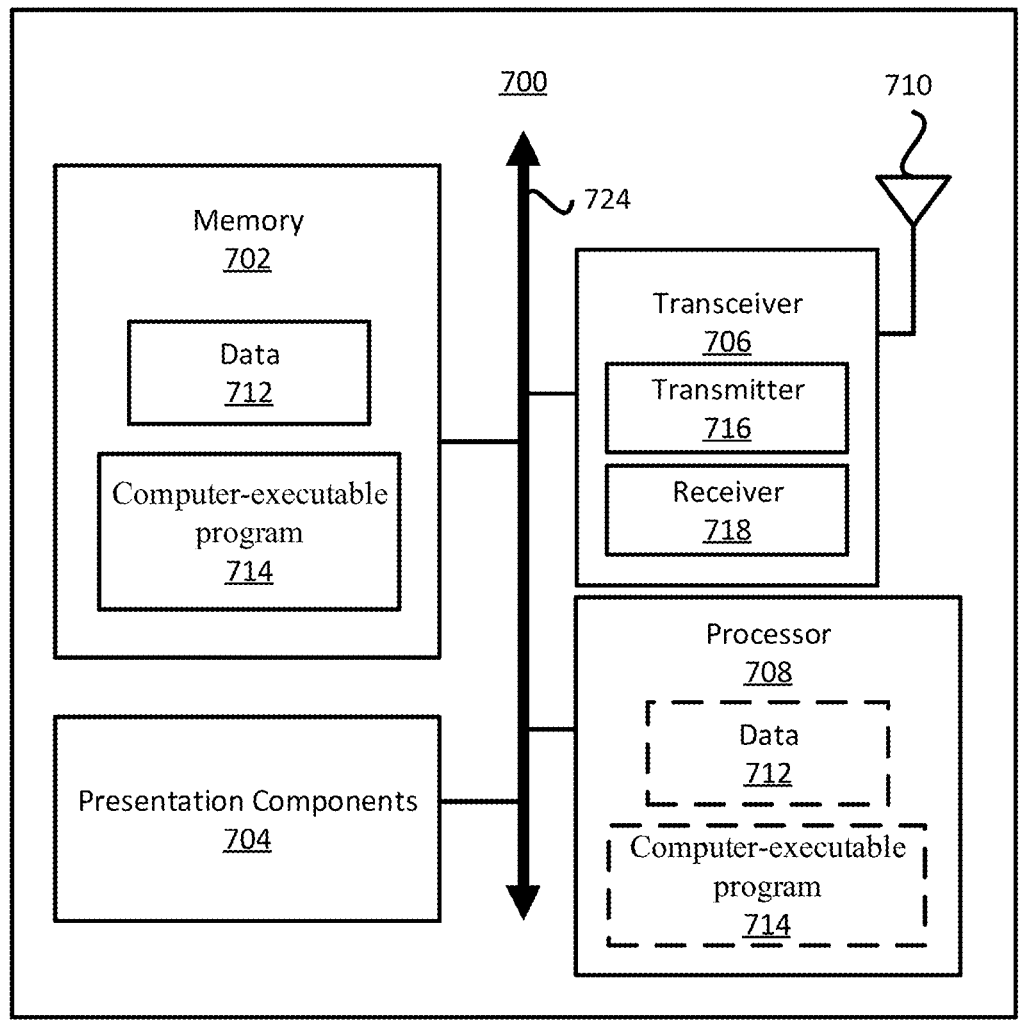
FIG. 7 illustrates a block diagram of a node for wireless communication according to an example implementation the present disclosure.

Referring to FIG. 7, FIG. 7 illustrates a block diagram of a node 700 for wireless communication according to an example implementation the present disclosure. As illustrated in FIG. 7, the node 700 may include a transceiver 706, a processor 708, a memory 702, one or more presentation components 704, and at least one antenna 710. The node 700 may also include a Radio Frequency (RF) spectrum band module, a BS communications module, an NW communications module, and a system communications management module, input/output (I/O) ports, I/O components, and power supply (not explicitly illustrated in FIG. 7). Each of these components may be in communication with each other, directly or indirectly, over one or more buses 724. In one implementation, the node 700 may be a UE or a BS that performs various functions disclosed herein, for example, with reference to FIGS. 1-6.

The transceiver 706 having a transmitter 716 (e.g., transmitting/transmission circuitry) and a receiver 718 (e.g., receiving/reception circuitry) may be configured to transmit and/or receive time and/or frequency resource partitioning information. In one implementation, the transceiver 706 may be configured to transmit in different types of subframes and slots, including, but not limited to, usable, non-usable and flexibly usable subframes and slot formats. The transceiver 706 may be configured to receive data and control channels.

The node 700 may include a variety of computer-readable media. Computer-readable media may be any available media that may be accessed by the node 700 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the previous disclosure should also be included within the scope of computer-readable media.

The memory 702 may include computer-storage media in the form of volatile and/or non-volatile memory. The memory 702 may be removable, non-removable, or a combination thereof. For example, the memory 702 may include solid-state memory, hard drives, optical-disc drives, etc. As illustrated in FIG. 7, the memory 702 may store computer-executable (or readable) program 714 (e.g., software codes) that are configured to, when executed, cause the processor 708 to perform various functions disclosed herein, for example, with reference to FIG. 6. Alternatively, the computer-executable program 714 may not be directly executable by the processor 708 but may be configured to cause the node 700 (e.g., when compiled and executed) to perform various functions disclosed herein.

The processor 708 (e.g., having processing circuitry) may include an intelligent hardware device, a Central Processing Unit (CPU), a microcontroller, an ASIC, etc. The processor 708 may include memory. The processor 708 may process the data 712 and the computer-executable program 714 received from the memory 702, and information through the transceiver 706, the baseband communications module, and/or the NW communications module. The processor 708 may also process information to be sent to the transceiver 706 for transmission through the antenna 710, to the NW communications module for transmission to a CN.

One or more presentation components 704 may present data indications to a person or other device. Examples of presentation components 704 may include a display device, speaker, printing component, vibrating component, etc.

From the previous disclosure, it is manifested that various techniques may be used for implementing the concepts described in the present disclosure without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Still, many rearrangements, modifications, and substitutions are possible without departing from the scope of the present disclosure.

What is claimed is:

1. A method performed by a first User Equipment (UE) for a Sidelink (SL) packet exchange operation, the method comprising:
   receiving at least one SL-Discontinuous Reception (SL-DRX) configuration and a plurality of SL resource pool configurations to be configured on the first UE;
   performing partial sensing based on at least one of the plurality of SL resource pool configurations when an SL-DRX operation is performed based on the at least one SL-DRX configuration, each of at least one SL resource pool configured by the at least one of the plurality of SL resource pool configurations comprising one or more time slots; and performing an SL-Channel Busy Ratio (SL-CBR) measurement associated with each of the at least one SL resource pool during one or more time slots during which the partial sensing is performed.

2. The method of claim 1, further comprising:
receiving an indicator associated with a first SL resource pool configuration among the plurality of SL resource pool configurations, the indicator indicating whether the first UE is enabled to perform the partial sensing on a first SL resource pool configured by the first SL resource pool configuration during at least one SL-DRX off-period.

3. The method of claim 2, further comprising:
performing the partial sensing on the first SL resource pool in the at least one SL-DRX off-period if the indicator indicates the first UE is enabled to perform the partial sensing, wherein
the at least one SL-DRX off-period is determined based on a time period during which the first UE is not within an SL-DRX active time.

4. The method of claim 3, further comprising:
switching between the SL-DRX active time and the at least one SL-DRX off-period according to at least one of an SL-DRX-onDurationTimer, an SL-DRX-SlotOffset, an SL-DRX-InactivityTimer, a DRX-RetransmissionTimerSL, an SL-DRX-LongCycleStartOffset, an SL-DRX-ShortCycle, an SL-DRX-ShortCycleTimer, or a DRX-Hybrid Automatic Repeat reQuest (HARQ)-ROund Trip Time (RTT)-TimerSL.

5. The method of claim 2, further comprising:
disabling performing the partial sensing on the first SL resource pool in the at least one SL-DRX off-period if the indicator indicates the first UE is disabled to perform the partial sensing, wherein
the at least one SL-DRX off-period is determined based on a time period in which the first UE is not within an SL-DRX active time.

6. The method of claim 2, wherein the first SL resource pool configuration associated with the indicator comprises one of an SL normal transmission resource pool configuration or an SL exceptional resource pool configuration.

7. The method of claim 2, wherein:
the first SL resource pool configuration associated with the indicator is received via at least one of:
broadcasting System Information (SI) from a serving cell of the first UE in a Uu interface,
UE-specific Radio Resource Control (RRC) signaling from the serving cell of the first UE in the Uu interface,
control signaling from a second UE in a PC5 interface, the second UE being paired with the first UE in one of an SL unicast group, an SL group-cast group, or a broadcast group, or
an SL pre-configuration, which is pre-installed at the first UE; and
the at least one SL-DRX configuration is received via at least one of:
the SL pre-configuration,
the control signaling from the second UE,
the broadcasting SI from the serving cell of the first UE in the Uu interface, or
the UE-specific RRC signaling from the serving cell of the first UE in the Uu interface, wherein:
the serving cell is an Evolved Universal Terrestrial Radio Access (E-UTRA) cell or a New Radio (NR) cell,
the UE-specific RRC signaling is an E-UTRA RRC signaling or an NR RRC signaling, and
the Uu interface is an NR Uu interface or an E-UTRA Uu interface.

8. The method of claim 1, further comprising:
receiving the plurality of SL resource pool configurations from one or more cells operating on one or more SL frequency carriers.

9. The method of claim 1, wherein performing the partial sensing based on the at least one of the plurality of SL resource pool configurations comprises:
monitoring at least one of first Sidelink Control Information (SCI) on a Physical Sidelink Control Channel (PSCCH), an SL packet on a Physical Sidelink Shared Channel (PSSCH), or second SCI on the PSSCH,
wherein:
the PSCCH and the PSSCH are associated with an SL resource pool of the at least one SL resource pool, and
the first SCI and the second SCI are from at least one second UE.

10. The method of claim 1, wherein the plurality of SL resource pool configurations includes at least one of:
an SL resource pool configuration for Long-Term Evolution Vehicle-to-Everything (LTE-V2X) SL communication service,
an SL resource pool configuration for LTE-V2X SL discovery service,
an SL resource pool configuration for NR SL communication service,
an SL resource pool configuration for NR SL discovery service,
an SL resource pool configuration for ProSe discovery service, or
an SL resource pool configuration for ProSe communication service.

11. A User Equipment (UE) in a wireless communication system for performing a Sidelink (SL) packet exchange operation, the wireless communication system further comprising a Base Station (BS), the UE comprising:
one or more non-transitory computer-readable media storing computer-executable instructions; and
at least one processor coupled to the one or more non-transitory computer-readable media, and configured to execute the computer-executable instructions to cause the UE to:
receive at least one SL-Discontinuous Reception (SL-DRX) configuration and a plurality of SL resource pool configurations to be configured on the UE;
perform partial sensing based on at least one of the plurality of SL resource pool configurations when an SL-DRX operation is performed based on the at least one SL-DRX configuration, each of at least one SL resource pool configured by the at least one of the plurality of SL resource pool configurations comprising one or more time slots; and
perform an SL-Channel Busy Ratio (SL-CBR) measurement associated with each of the at least one SL resource pool during the one or more time slots during which the partial sensing is performed.

12. The UE of claim 11, wherein the at least one processor is further configured to execute the computer-executable instructions to cause the UE to:
receive an indicator associated with a first SL resource pool configuration among the plurality of SL resource pool configurations, the indicator indicating whether the UE is enabled to perform the partial sensing on a first SL resource pool configured by the first SL resource pool configuration during at least one SL-DRX off-period.

13. The UE of claim 12, wherein the at least one processor is further configured to execute the computer-executable instructions to cause the UE to:
perform the partial sensing on the first SL resource pool in the at least one SL-DRX off-period if the indicator indicates the UE is enabled to perform the partial sensing, wherein
the at least one SL-DRX off-period is determined based on a time period during which the UE is not within an SL-DRX active time.

14. The UE of claim 13, wherein the at least one processor is further configured to execute the computer-executable instructions to cause the UE to:
switch between the SL-DRX active time and the at least one SL-DRX off-period according to at least one of an SL-DRX-onDurationTimer, an SL-DRX-SlotOffset, an SL-DRX-InactivityTimer, a DRX-RetransmissionTimerSL, an SL-DRX-LongCycleStartOffset, an SL-DRX-ShortCycle, an SL-DRX-ShortCycleTimer, or a DRX-Hybrid Automatic Repeat reQuest (HARQ)-Round Trip Time (RTT)-TimerSL.

15. The UE of claim 12, wherein the at least one processor is further configured to execute the computer-executable instructions to cause the UE to:
disable performing the partial sensing on the first SL resource pool in the at least one SL-DRX off-period if the indicator indicates the UE is disabled to perform the partial sensing, wherein
the at least one SL-DRX off-period is determined based on a time period in which the UE is not within an SL-DRX active time.

16. The UE of claim 12, wherein the first SL resource pool configuration associated with the indicator comprises one of an SL normal transmission resource pool configuration or an SL exceptional resource pool configuration.

17. The UE of claim 12, wherein:
the first SL resource pool configuration associated with the indicator is received via at least one of:
broadcasting System Information (SI) from a serving cell of the UE in a Uu interface,
UE-specific Radio Resource Control (RRC) signaling from the serving cell of the UE in the Uu interface,
control signaling from a second UE in a PC5 interface, the second UE being paired with the UE in one of an SL unicast group, an SL group-cast group, or a broadcast group, or
an SL pre-configuration, which is pre-installed at the UE; and
the at least one SL-DRX configuration is received via at least one of:
the SL pre-configuration,
the control signaling from the second UE,
the broadcasting SI from the serving cell of the UE in the Uu interface, or
the UE-specific RRC signaling from the serving cell of the UE in the Uu interface, wherein:
the serving cell is an Evolved Universal Terrestrial Radio Access (E-UTRA) cell or a New Radio (NR) cell,
the UE-specific RRC signaling is an E-UTRA RRC signaling or an NR RRC signaling, and
the Uu interface is an NR Uu interface or an E-UTRA Uu interface.

18. The UE of claim 11, wherein the at least one processor is further configured to execute the computer-executable instructions to cause the UE to:
receive the plurality of SL resource pool configurations from one or more cells operating on one or more SL frequency carriers.

19. The UE of claim 11, wherein performing the partial sensing based on the at least one of the plurality of SL resource pool configurations comprises:
monitoring at least one of first Sidelink Control Information (SCI) on a Physical Sidelink Control Channel (PSCCH), an SL packet on a Physical Sidelink Shared Channel (PSSCH), or second SCI on the PSSCH, wherein:
the PSCCH and the PSSCH are associated with an SL resource pool of the at least one SL resource pool, and
the first SCI and the second SCI are from at least one second UE.

20. The UE of claim 11, wherein the plurality of SL resource pool configurations includes at least one of:
an SL resource pool configuration for Long-Term Evolution Vehicle-to-Everything (LTE-V2X) SL communication service,
an SL resource pool configuration for LTE-V2X SL discovery service,
an SL resource pool configuration for NR SL communication service,
an SL resource pool configuration for NR SL discovery service,
an SL resource pool configuration for ProSe discovery service, or
an SL resource pool configuration for ProSe communication service.

* * * * *